United States Patent [19]
Tahara et al.

[11] Patent Number: 5,164,828
[45] Date of Patent: Nov. 17, 1992

[54] VIDEO SIGNAL TRANSMISSION AND METHOD AND APPARATUS FOR CODING VIDEO SIGNAL USED IN THIS

[75] Inventors: Katsumi Tahara, Kanagawa; Seiichi Emoto, Tokyo, both of Japan

[73] Assignee: Sony Corporation, Tokyo, Japan

[21] Appl. No.: 658,787

[22] Filed: Feb. 21, 1991

[30] Foreign Application Priority Data

Feb. 26, 1990 [JP] Japan ................................ 2-44846
Feb. 28, 1990 [JP] Japan ................................ 2-47521
Feb. 28, 1990 [JP] Japan ................................ 2-47531

[51] Int. Cl.⁵ .................... H04N 7/12; H04N 7/18; H04N 7/14
[52] U.S. Cl. .................... 358/136; 358/105; 358/135; 358/85
[58] Field of Search ............ 368/105, 136, 135, 85

[56] References Cited

U.S. PATENT DOCUMENTS

| | | | |
|---|---|---|---|
| 4,217,609 | 8/1980 | Hatori et al. ............ | 358/136 |
| 4,546,386 | 10/1985 | Matsumoto et al. ......... | 358/136 |
| 4,689,672 | 8/1987 | Furukawa et al. .......... | 358/136 |
| 4,942,465 | 7/1990 | Ohta ..................... | 358/133 |
| 4,951,140 | 8/1990 | Veno et al. .............. | 358/105 |
| 4,953,023 | 8/1990 | Kondo .................... | 358/135 |
| 4,999,704 | 3/1991 | Ando ..................... | 358/136 |
| 5,005,076 | 4/1991 | Stroppina et al. ......... | 358/136 |
| 5,089,888 | 2/1992 | Zdepski et al. ........... | 358/136 |

*Primary Examiner*—John K. Peng
*Attorney, Agent, or Firm*—Alvin Sinderbrand; William S. Frommer

[57] ABSTRACT

In a video signal transmission system, in which video signals are transformed to high efficiency coded data and are then transmitted, a quantization step size is enlarged when quantizing intra coded picture data to avoid an excessive increase in the amount of data generated. The amount of residual data in a transmission buffer memory is monitored, and frame dropping is initiated when it exceeds a certain predetermined level, but the frame dropping operation is not completed until the amount of residual data falls below a different, smaller predetermined level. Video signals which are sent immediately after a transmission line is connected to a destination are intra coded to enhance system usability.

6 Claims, 26 Drawing Sheets

| Bit 2 | Bit 1 | Bit 0 | Macro Block Type |
|---|---|---|---|
| Filter on/off ($\Gamma_{IJ}$=on, $\Gamma_{0J}$=off) | Inter/Intra ($\Gamma_{IJ}$=Intra, $\Gamma_{0J}$=Inter) | MC on/off ($\Gamma_{IJ}$=on, $\Gamma_{0J}$=off) | |
| 0 | 1 | 0 | Intra |
| 0 | 0 | 0 | Inter |
| 0 | 0 | 1 | MC-not filtered |
| 1 | 0 | 1 | MC-filtered |

FIG. 11

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

$Coeff(i)$ $(i=1\sim64)$

FIG. 12

| | 102A | 102B | 108A | 108B | $D_V$ | $D_{VD}$ | $D_H$ | $D_{VD}$ |
|---|---|---|---|---|---|---|---|---|
| AR1 | P1 | P1 | P1 | P1 | $2A_{0,0}$ | $4A_{0,0}$ | $8A_{0,0}$ | $16A_{0,0}$ |
| AR2 | P1 | P1 | P2 | P2 | $2A_{0,0}$ | $4A_{0,0}$ | $4A_{-1,0}+4A_{1,0}$ | $4A_{-1,0}+8A_{0,0}+4A_{1,0}$ |
| AR3 | P1 | P1 | P1 | P1 | $2A_{0,0}$ | $4A_{0,0}$ | $8A_{0,0}$ | $16A_{0,0}$ |
| AR4 | P2 | P2 | P1 | P1 | $A_{0,-1}-A_{0,1}$ | $A_{0,-1}-2A_{0,0}-A_{0,1}$ | $2A_{0,-1}-4A_{0,0}-2A_{0,1}$ | $4A_{0,-1}+8A_{0,0}+4A_{0,1}$ |
| AR5 | P2 | P2 | P2 | P2 | $A_{0,-1}+A_{0,1}$ | $A_{0,-1}+2A_{0,0}+A_{0,1}$ | $A_{-1,-1}+2A_{-1,0}+A_{-1,1}$ $+A_{1,-1}+2A_{1,0}+A_{1,1}$ | $A_{-1,-1}+2A_{-1,0}+A_{-1,1}$ $+2A_{0,-1}+4A_{0,0}+2A_{0,1}$ $+A_{1,-1}+2A_{1,0}+A_{1,1}$ |
| AR6 | P2 | P2 | P1 | P1 | $A_{0,-1}+A_{0,1}$ | $A_{0,-1}+2A_{0,0}+A_{0,1}$ | $2A_{0,-1}+4A_{0,0}+2A_{0,1}$ | $4A_{0,-1}+8A_{0,0}+4A_{0,1}$ |
| AR7 | P1 | P1 | P2 | P2 | $2A_{0,0}$ | $4A_{0,0}$ | $8A_{0,0}$ | $16A_{0,0}$ |
| AR8 | P1 | P1 | P2 | P2 | $2A_{0,0}$ | $4A_{0,0}$ | $4A_{-1,0}+4A_{1,0}$ | $4A_{-1,0}+8A_{0,0}+4A_{1,0}$ |
| AR9 | P1 | P1 | P1 | P1 | $2A_{0,0}$ | $4A_{0,0}$ | $8A_{0,0}$ | $16A_{0,0}$ |

FIG. 20

| $A_{1,1}$ | $A_{0,1}$ | $A_{-1,1}$ |
|---|---|---|
| $A_{1,0}$ | $A_{0,0}$ | $A_{-1,0}$ |
| $A_{1,-1}$ | $A_{0,-1}$ | $A_{-1,-1}$ |

FIG. 21

|  | 102A | 102B | 108A | 108B |
|---|---|---|---|---|
| AR1 | P1 | P2 | P1 | P2 |
| AR2 | P1 | P2 | P2 | P2 |
| AR3 | P1 | P2 | P2 | P1 |
| AR4 | P2 | P2 | P1 | P2 |
| AR5 | P2 | P2 | P2 | P2 |
| AR6 | P1 | P1 | P1 | P2 |
| AR7 | P1 | P2 | P2 | P1 |
| AR8 | P1 | P2 | P1 | P1 |
| AR9 | P1 | P2 | P1 | P2 |

FIG.26

VIDEO SIGNAL TRANSMISSION AND METHOD AND APPARATUS FOR CODING VIDEO SIGNAL USED IN THIS

BACKGROUND OF THE INVENTION

This invention relates to a video signal transmission system, and more particularly is suitably applied to a case in which video signals are transformed to high efficiency coded data and are then transmitted.

In the picture phone system and the video conference system, heretofore there has been proposed a video signal transmission system in which video signals which constitute moving pictures are high efficiency coded to provide intra coded frame data and inter coded frame data, and thereby the moving picture video signals are transmitted through transmission lines with relatively strict limits in transmission capacity (Japanese Patent Laid-open Publication No. 63 (1988)-1183).

More specifically, in a case where pictures PC1, PC2, PC3, . . . which constitute moving pictures at respective times t=t1, t2, t3, . . . are transmitted as shown in FIG. 1, the transmission efficiency is enhanced by compressing the picture data to be transmitted, using the fact that video signals are highly autocorrelated over time. In the intra coding, pictures PC1, PC2, PC3, . . . are compressed in such a manner that differences are determined by comparing pixel with a predetermined reference value. Thus, the amount of picture data transmitted for each picture PC1, PC2, PC3, . . . is compressed using the autocorrelation between pixel data in the same frame.

In the inter coding, picture data PC12, PC23, . . . which are differences between two successive pictures PC1 and PC2, PC2 and PC3, . . . , respectively, are determined as shown in FIG. 1, and are transmitted together with the intra coded picture data of the original picture PC1 at the time t=t1.

Thus, it is possible to send the pictures PC1, PC2, PC3, . . . in the format of high efficiency coded digital data which is markedly small in amount as compared to data in the case where all the picture data is sent.

The coding of such picture signals is achieved by a picture data generating system 1 having a configuration shown in FIG. 2.

The picture data generating system 1 performs processing operations, such as every other field dropping and every other field line dropping, on input video signals VD in a preprocessing circuit 2. Subsequently, the luminance signals and chrominance signals thereof are transformed to transmission unit block (referred to as macro block) data S11 which is 16 pixels (horizontal)×16 pixels (vertical), and are then fed to a picture data coding circuit 3.

The picture data coding circuit 3 accepts predicted current frame data S12 constructed in a prediction coding circuit 4, and either determines the difference between the predicted current frame data S12 and the macro block data S11 to produce inter coded data (this is referred to as inter coding mode) or determines the difference between the macro block data S11 and the reference data to generate intra coded data. In either case, this data is fed to a transform coding circuit 5 as differential data S13.

The transform coding circuit 5 consists of a discrete cosine transform circuit and provides transform coded data S14, high efficiency coded by orthogonally transforming the differential data S13, to a quantizer 6, which sends quantized picture data S15.

The quantized picture data S15 thus obtained from the quantizer 6 is high efficiency coded again in a retransform coding circuit 7 which includes a variable length coding circuit and is then fed a s transmission picture data S16 to a transmission buffer memory 8.

Moreover, the quantized picture data S15 undergoes inverse quantization and inverse transform coding operations in the prediction coding circuit 4, so that the quantized picture data S15 is decoded to differential data. Then, the predicted previous frame data is modified by the differential data, and thereby new predicted previous frame data is stored in the prediction coding circuit 4. Furthermore, the new predicted previous frame data which is stored is motion compensated by motion detection data, which has been constructed on the basis of the macro block data S11, to produce predicted current frame data for feeding to the picture data coding circuit 3. Thus, the difference between the macro block data S11 of a frame (the current frame) which is to be transmitted and the predicted current frame data S12 is determined and supplied as the differential data S13.

When the motion pictures mentioned above in referring to FIG. 1 are sent with the construction of FIG. 2, the picture data of the picture PC1 is firstly provided as macro block data S11 at the time t1 in FIG. 1. In this case, the picture data coding circuit 3 is placed in the intra coding mode, and provides intra coded differential data S13 to the transform coding circuit 5. In this manner transmission picture data S16 is fed to the transmission buffer memory 8 through the quantizer 6 and the retransform coding circuit 7.

On the other hand, the quantized picture data S15 obtained at the output of the quantizer 6 is prediction coded in the prediction coding circuit 4, and thereby predicted previous frame data which represents the transmission picture data S16 sent to the transmission buffer memory 8 is held in the previous frame memory. When macro block data S11 which represents the picture PC2 at time t2 is fed to the picture data coding circuit 3, the predicted previous frame data is motion compensated to produce the predicted current frame data S12, which is provided to the picture data coding circuit 3.

Thus, the picture data coding circuit 3 provides differential data S13 inter coded to the transform coding circuit 5 at the time t=t2. In this manner, the differential data which represents changes in the picture between the frames is sent as transmission picture data S16 to the transmission buffer memory 8 while the quantized picture data S15 thereof is provided to the prediction coding circuit 4 to thereby construct and store predicted previous frame data in the prediction coding circuit 4.

Only the differential data representing changes in the picture between the frames is sequentially transmitted to the transmission buffer memory 8 by repeating similar operations during the inter coding operation of the picture data coding circuit 3.

The transmission buffer memory 8 accumulates transmission picture data S16 which has been received in this manner, and successively sends the accumulated transmission picture data S16 as transmission data $D_{TRANS}$ to a transmission line 9 at a data transmission rate which is determined according to the transmission capacity of the transmission line 9.

Concurrently, the transmission buffer memory 8 detects the amount of residual data contained therein, in order to feed back residual amount data S17, which changes according to the amount of the residual data, to the quantizer 6. In this manner the quantization step size is controlled according to the residual amount data S17 in order to regulate the amount of data generated as the transmission picture data S16, so that an appropriate amount of residual data (so as not to produce overflow or underflow) is kept in the transmission buffer memory 8.

When the amount of residual data in the transmission buffer memory 8 increases to a predetermined upper limit, rough quantization is carried out in the quantizer 6 by enlarging the step size of the quantization step STPS (FIG. 3) of the quantizer 6, so that the amount of the transmission picture data S16 generated is reduced.

On the contrary, when the amount of residual data in the transmission buffer memory 8 decreases to a predetermined lower limit, the step size of the quantization step STPS of the quantizer 6 is reduced to a smaller value, and thus the amount of the transmission picture data S16 generated is increased by performing fine quantization in the quantizer 6.

More specifically, in the transmission system, an evaluation function is performed stepwise by a motion vector detection circuit with reference to a picture of a predetermined frame (hereinafter referred to as the reference frame).

Moreover, in the transmission system the picture of the reference frame is shifted by the motion vector to produce a comparison reference picture, and then differential data between that comparison reference picture and the picture to be transmitted is calculated. The differential data is transmitted together with the motion vector.

In the receiving system, the reference frame picture previously transmitted is shifted by the motion vector sent, and then the differential data sent is added to reconstruct the original picture.

In the conventional picture data generating system 1, the transmission buffer memory 8 is, as described, provided as a means for transmitting significant picture information while the data transmission rate of the transmission data $D_{TRANS}$ is limited according to the transmission capacity of the transmission line 9, and thereby picture data is accumulated in the transmission buffer memory so that the picture data of the transmission capacity of the transmission line 9 may be sent without excess or deficiency. However, it is possible in practice that the transmission buffer memory 8 overflows when the amount of picture data generated in the picture data generating system 1 becomes extremely large.

Moreover, in the picture data generating system 1 of such a construction, there is a problem in that the transmission buffer memory overflows due to an increase of the amount of coded transmission data generated when moving pictures to be transmitted are moving rapidly or when the contents thereof significantly changes, for example, as in a change of scene.

As one technique to solve the problem, there has been suggested a frame dropping technique in which subsequent frames are not coded or transmitted when the amount of transmission data generated is excessive.

In a case where rapidly moving pictures are sent for a relatively long time, however, frame dropping operations are repeated often since the amount of the transmission data generated continues to increase. Thus, there is a problem in that visual smoothness of movement of the reproduced moving pictures is lost, and hence this technique is not sufficient for sending moving pictures.

Furthermore, in this type of video signal transmission system using inter coding, one frame of a picture is divided into a plurality of regions (hereinafter referred to as macro blocks) and a motion vector is determined for each macro block.

More specifically, within a predetermined motion vector detection range the picture of a reference frame is sequentially moved relative to each macro block, and thereby the shift position (which provides the motion vector) for which the differential data is minimized determined.

The picture of the reference frame is shifted to the determined position for the region which corresponds to the macro block, and thereby picture data of a comparison reference for the differential data is produced.

By repeating this procedure, the differential data is determined for each macro block, and is then sent after discrete cosine transformation, quantization, and variable length coding operations.

Thus, in this type of video signal transmission system, the picture data is coded in such a way that boundaries between macro blocks become obtrusive when a motion vector is detected for each macro block.

To make these boundaries unobtrusive, there has been considered a technique in which in determining differential data a high frequency zone of picture data for comparison reference is suppressed by means of a filter circuit as disclosed in Japanese Patent Laid-open Publication 60(1985)-206,318, for example.

For making the boundaries unobtrusive by suppressing a high frequency zone of picture data for comparison reference, it is necessary to change the characteristic of the filter according to the position of the picture data, and there is hence a problem in that practical filter circuits are needed to perform this processing in real time.

Furthermore, a picture of the reference frame is necessary for inter coding processing to decode the original picture data.

For this reason, in this type of video signal transmission system the immediately previous frame, for example, ma be selected as the reference frame, and intra coded picture data may be sent in place of inter coded differential data for each such predetermined frame.

Intra coding is a process which codes picture data at a high efficiency using the correlation of data within the frame and is inferior in efficiency to the inter coding process. However, with intra coding the original picture can be reconstructed from only the picture data sent.

Accordingly, the original picture data can be reconstructed on the basis of the differential data transmitted if the immediately previous frame is intra coded, and if with that frame selected as the reference frame, picture data of the subsequent frame is inter coded.

Moreover, on the basis of the picture data reconstructed in this manner picture data of subsequent frames can be also reconstructed.

In this type of video signal transmission system, the transmission line is connected after the coding of picture data is commenced.

Thus, inter coding may be performed and repeated just after the line is connected. In this case, the correct picture cannot be reconstructed at the receiving end until intra coded picture data is sent.

More specifically, in the case where intra coded picture data is sent every 128 frames, for example, the speaker at the receiving end must talk, while monitoring an unnatural picture displayed for about 13 seconds maximum when the frame frequency of the picture data is 10 Hz. Thus, there is a problem with the practical usability of the transmission system as described.

SUMMARY OF THE INVENTION

In view of the foregoing, an object of this invention is to provide a video signal transmission system which prevents an excessively large amount of quantized data from being produced by determining the quantization step size according to the format of picture data to be quantized.

Another object of this invention is to provide a video signal transmission system which performs frame dropping while moving pictures are kept as visually smooth in movement as possible.

Another object of this invention is to provide a filter circuit suitable for use in a video signal transmission system.

Another object of this invention is to provide a video signal transmission system which is more usable than the prior art by effectively avoiding unnatural picture displays.

To solve a problem as described, in a video signal coding method in which video signals VD are alternatively intra coded and inter coded and are then quantized for transforming to picture data, the quantization is, according to the present invention, performed by enlarging the quantization step QNT to a predetermined rough quantization level QNT=31 when the picture data to be quantized is in an intra coded format.

When picture data which has been high efficiency coded in an inter coding or intra coding mode is quantized, the amount of picture data produced by intra coding is extremely large.

When picture data to be quantized is in an intra coding format, the quantization step size is enlarged. In this manner, it is possible to effectively restrain the amount of picture data generated by the quantization from becoming excessively large.

Moreover to solve a problem as described, a video signal coding system according to the present invention includes a transmission buffer circuit 32. In the video signal coding system, high efficiency coded transmission picture data S40 is temporarily stored in the transmission buffer circuit 32, and the transmission picture data S40 stored is sequentially outputted to a transmission line 43 according to a data transmission capacity of the transmission line 43, and frame dropping of the transmission picture data S40 is performed when a data residual amount "Buffer" of the transmission buffer circuit 32 exceeds a predetermined upper limit (QNT=31). The frame dropping operation continues until the data residual amount "Buffer" of the transmission buffer circuit 32 reduces to a predetermined level MG (QNT=1) smaller than the upper limit (QNT=31).

When the data residual amount "Buffer" of the transmission buffer memory 32 exceeds the upper limit (QNT=31), the frame dropping operation is carried out, and then the frame dropping operation continues until the data residual amount "Buffer" becomes below the desired value MG (QNT=1) smaller than the upper limit (QNT=31). In this manner, it is avoided that the frame dropping operation is quickly resumed when the data residual amount "Buffer" is rapidly increased after the previous frame dropping operation is completed, and moreover it is possible to quickly converge the data residual amount "Buffer" to the desired value MG (QNT=1) when the amount of data generated decreases after the frame dropping operation is completed.

In this manner, the movement of the output pictures can be made smooth and degradation in picture quality thereof can be avoided.

Furthermore to solve a problem as described, the present invention is provided with: a vertical digital filter circuit having a plurality of delay circuits 101A and 101B in series, each of the delay circuits 101A and 101B outputting picture data consecutive in the vertical scanning direction; a vertical selection circuit 102A, 102B and 104 for selectively outputting the picture data outputted from the vertical digital filter circuit; a horizontal digital filter circuit having a plurality of delay circuits 107A, 107B and 107C outputting picture data consecutive in the horizontal scanning direction and a horizontal selection circuit 108A, 108B and 109 for selectively outputting the picture data outputted form the horizontal digital filter circuit. In particular, picture data $D_{PRI}$ are sequentially inputted to either the vertical digital filter circuit or the horizontal digital filter circuit; the output data $D_v$ or $D_H$ of the vertical selection circuit 102A, 102B and 104 of the horizontal selection circuit 108A, 108B and 109 is fed to the horizontal digital filter circuit or the vertical digital filter circuit, respectively; and the picture data $D_{PRO}$ outputted from the horizontal selection circuit 108A, 108B and 109 or the vertical selection circuit 102A, 102B and 104 is corrected by switching the selective outputs from the vertical selection circuit 102A, 102B and 104 and the horizontal selection circuit 108A, 108B and 109.

In the vertical digital filter circuit 101A and 101B, and the vertical selection circuit 102A, 102B and 104, picture data consecutive in the vertical scanning direction are selectively outputted, whereas in the horizontal digital filter circuit 107A, 107B and 107C and the horizontal selection circuit 108A, 108B and 109, picture data consecutive in the horizontal scanning direction are selectively outputted. The picture data $D_{PRI}$ is sequentially inputted, and at the same time output data of the vertical selection circuit 102A, 102B and 104 or the horizontal selection circuit 108A, 108B, and 109 is outputted to the horizontal digital filter circuit 107A, 107B and 107C or the vertical digital filter circuit 101A and 101B, respectively, and the characteristic of the filter is switched depending on the selection of outputs from the vertical selection circuit 102A, 102B and 104 and the horizontal selection circuit 108A, 108B, and 109.

Furthermore to solve a problem as described, in the video signal transmission system 161 in which video signals are transmitted by inter coding and intra coding in a repetitive, predetermined cycle, according to the present invention the video signals $D_{IN}$ of predetermined frames are intra coded and then sent after the transmission line L1 is connected to a transmission destination.

When video signals $D_{IN}$ of predetermined frames are intra coded and then sent after the transmission line L1 is connected to a transmission destination, a picture which was sent just after the line was connected can be properly reconstructed at the destination, and the speaker may monitor the picture.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 11 is a table showing types of macro blocks;

FIG. 12 is an illustration of the transform coefficient matrix;

FIGS. 18 to 22 are schematic diagrams showing the operation thereof;

FIGS. 25 and 26 are schematic diagrams illustrating other embodiments;

DETAILED DESCRIPTION OF THE INVENTION

Figure 1:
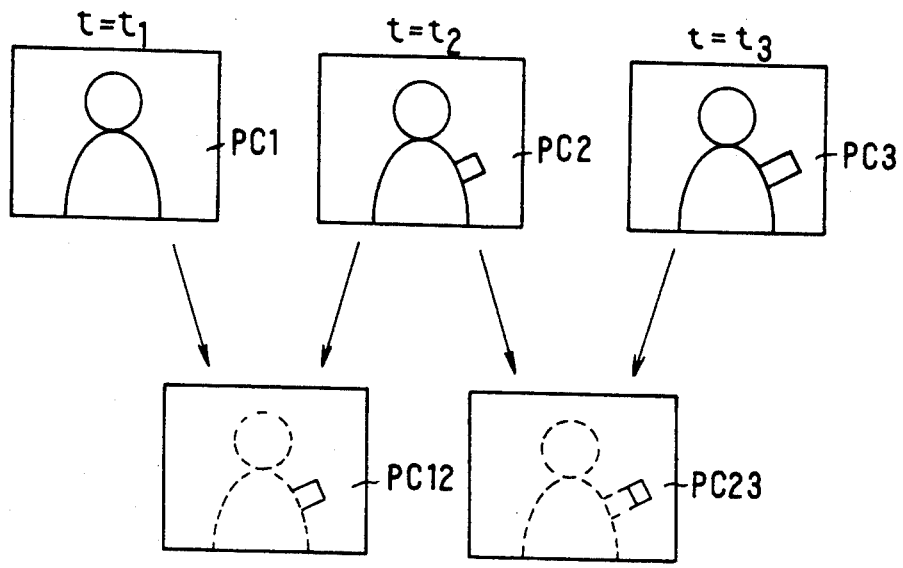
FIG. 1 is a schematic diagram for illustrating the inter/intra frame coding.
Figure 3:
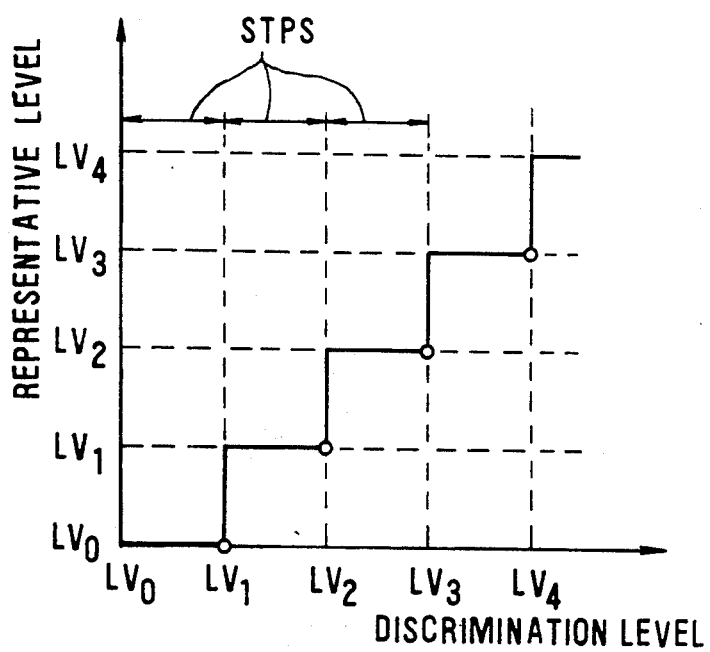
FIG. 3 is a graph showing the quantization step thereof.
Figure 2:
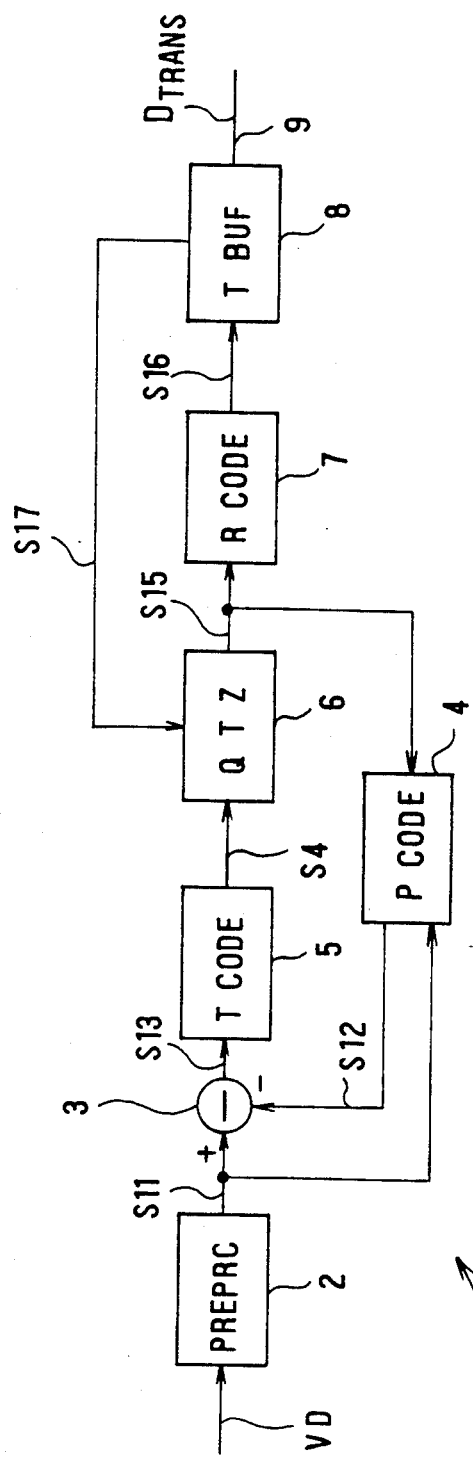
FIG. 2 is a block diagram illustrating the conventional picture data generating system.
Figure 4A:
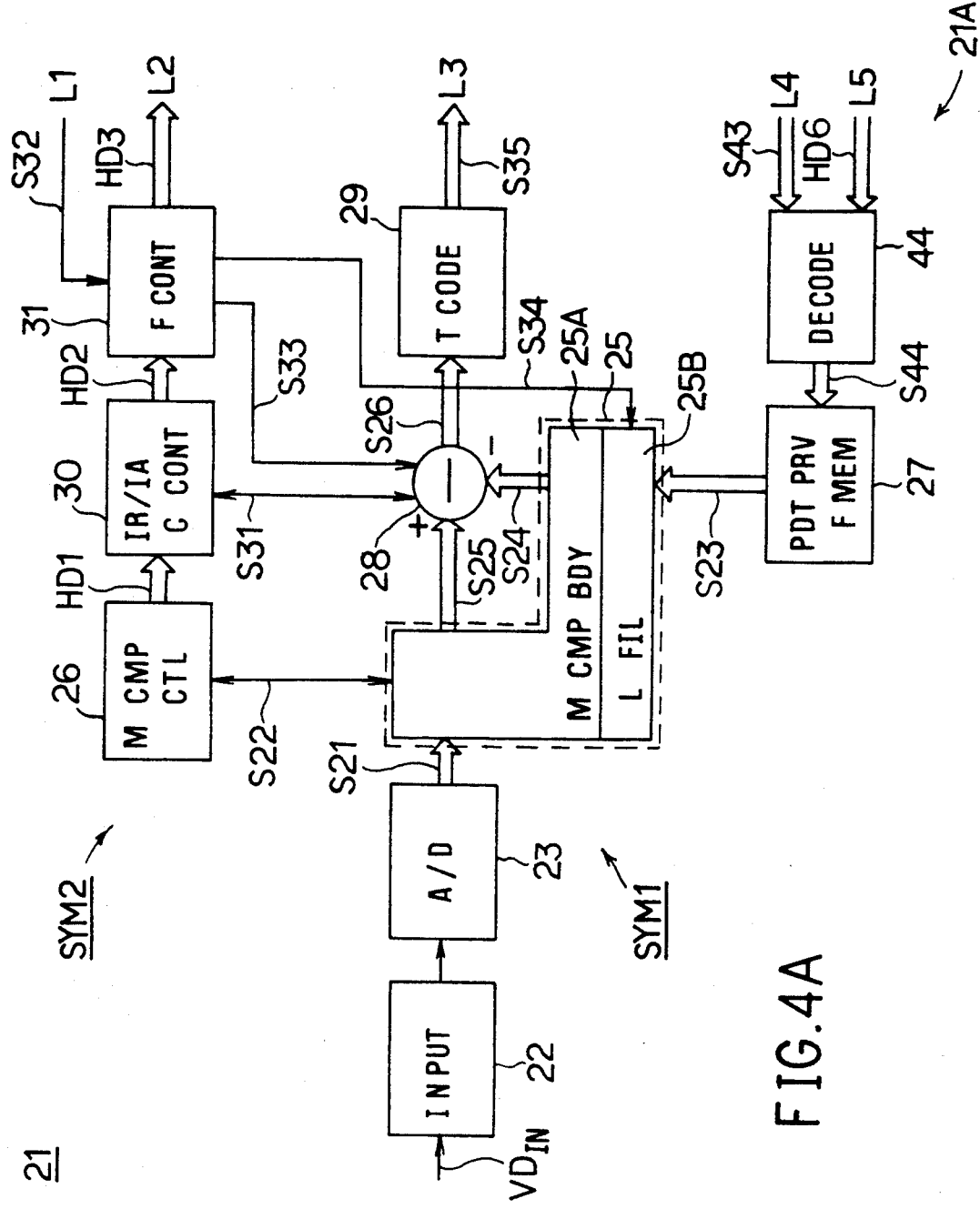
FIGS. 4A, 4B and 5 are block diagrams illustrating the encoder and decoder which constitutes the picture information transmission system using the video signal coding method according to the present invention.
Figure 4B:
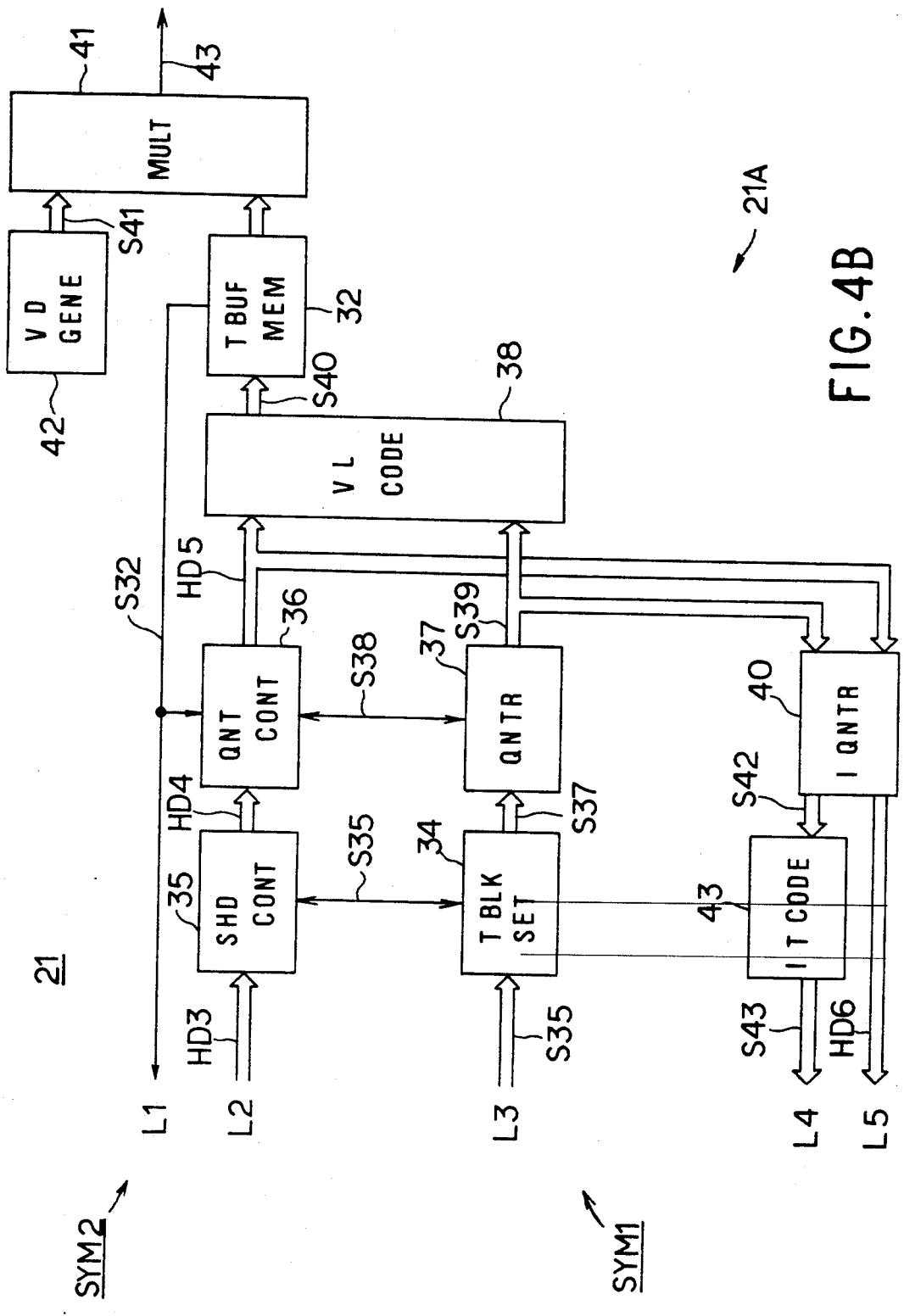
Figure 5:
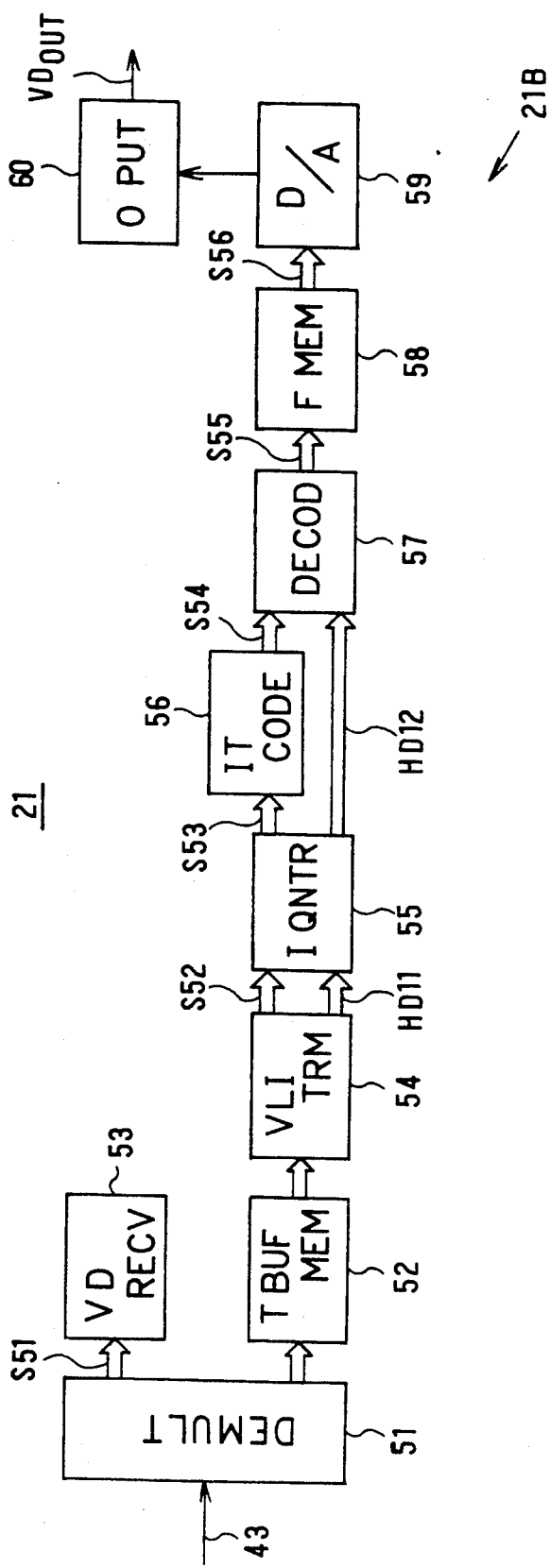

Preferred embodiments of this invention will be described with reference to the accompanying drawings:

(1) The Whole Construction of the Picture Information Transmission System of the First Embodiment In FIGS. 4A, 4B and 5, a picture information transmission system 21 consists of an encoder 21A and a decoder 21B. The encoder 21A preprocesses an input video signal $VD_{IN}$ in an input circuit unit 22 and then sends input picture data S21, which is pixel data of 16 by 16 pixels, that is the pixel data of a macro block MB, from an analog/digital conversion circuit 23 to a pixel data processing system SYM1. At the same time as the pixel data of the macro block MB is processed by the pixel data processing system SYM1, information data corresponding to the pixel data to be processed is sequentially transmitted through a header data processing system SYM2. Thus, pixel data and header data are processed by the pipe line technique in the pixel data processing system SYM1 and the header data processing system SYM2, respectively.

Figure 6:
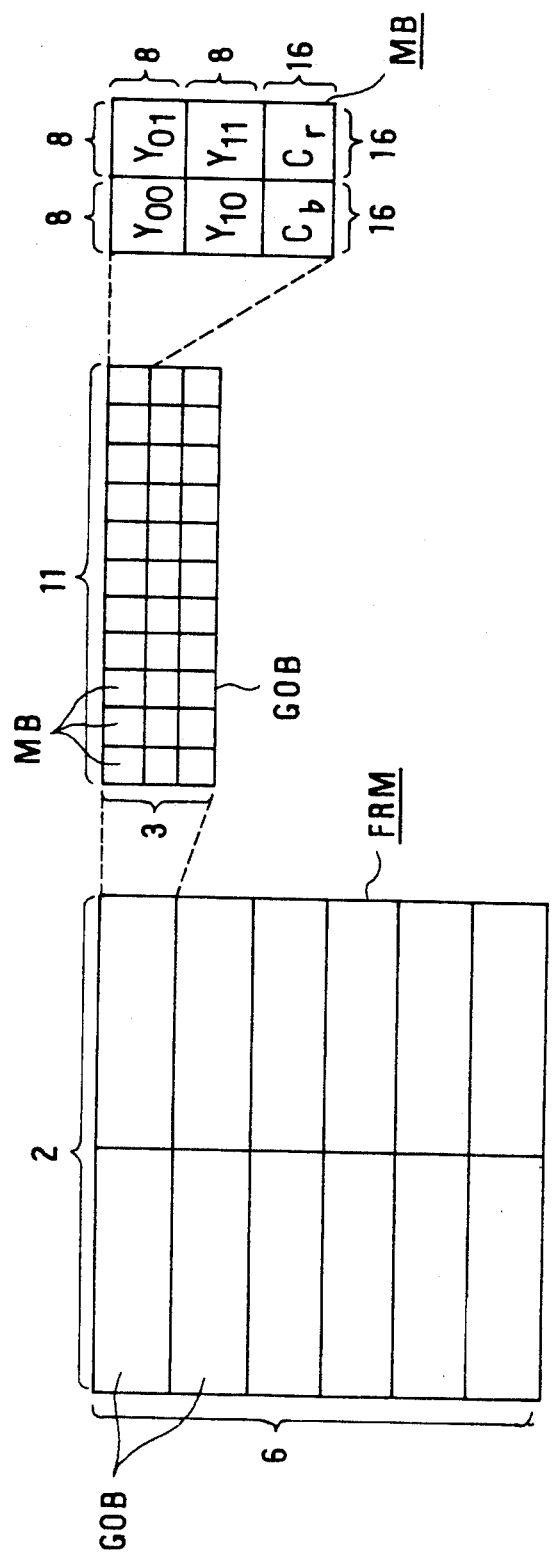
FIG. 6 is a schematic diagram showing the construction of the frame picture data.

In this embodiment, macro block data which is sequentially sent as the input picture data S21 is extracted from frame picture data FRM according to a technique shown in FIG. 6.

Firstly, frame picture data FRM of a picture is separated into a 2 (horizontal direction)×6 (vertical direction) grid of block groups GOB. Each block group GOB contains 11 (horizontal direction)×3 (vertical direction) macro blocks MB. Each macro block MB contains 16 by 16 pixels of luminance signal data $Y_{00}$–$Y_{11}$ (each consisting of 8 by 8 pixels of luminance signal data) and chrominance signal data $C_b$ and $C_r$ which is chrominance signal data corresponding to all the pixel data of the luminance signal data $Y_{00}$–$Y_{11}$.

Thus, the input picture data S21 which is sent for each macro block MB is fed to a motion compensation circuit 25. The motion compensation circuit 25 compares the input picture data S21 and predicted previous frame data S23 from a predicted previous frame memory 27 in response to a motion detection control signal S22 fed from a motion compensation control unit 26, which is provided in the header data processing system SYM2, and the motion compensation circuit 25 thereby determines motion vector data "MVD(x)" and "MVD(y)", which are supplied in first header data HD1 (FIGS. 7A and 7B) to the motion compensation control unit 26. Furthermore, the motion compensation circuit 25 constructs predicted current frame data S24 by motion compensating the predicted previous frame data S23 by the motion vector data "MVD(x)" and "MVD(y)" in a motion compensation circuit body 25A. The predicted current frame data S24 is fed to a picture data coding circuit 28 together with the input picture data S21 to be processed.

Figure 7A:
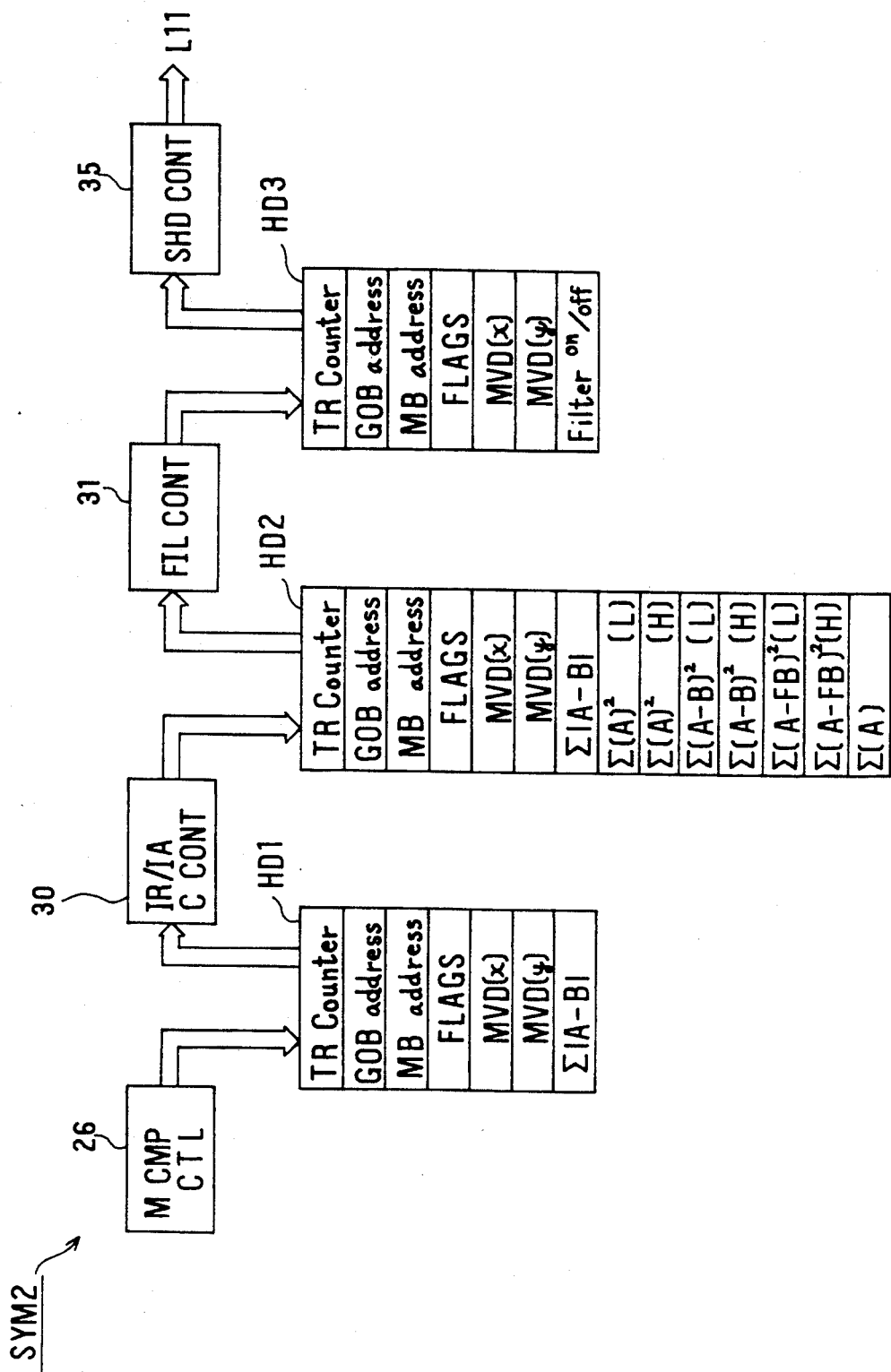
FIGS. 7A and 7B are block diagrams illustrating the header data processing system of FIGS. 4A and 4B.
Figure 7B:
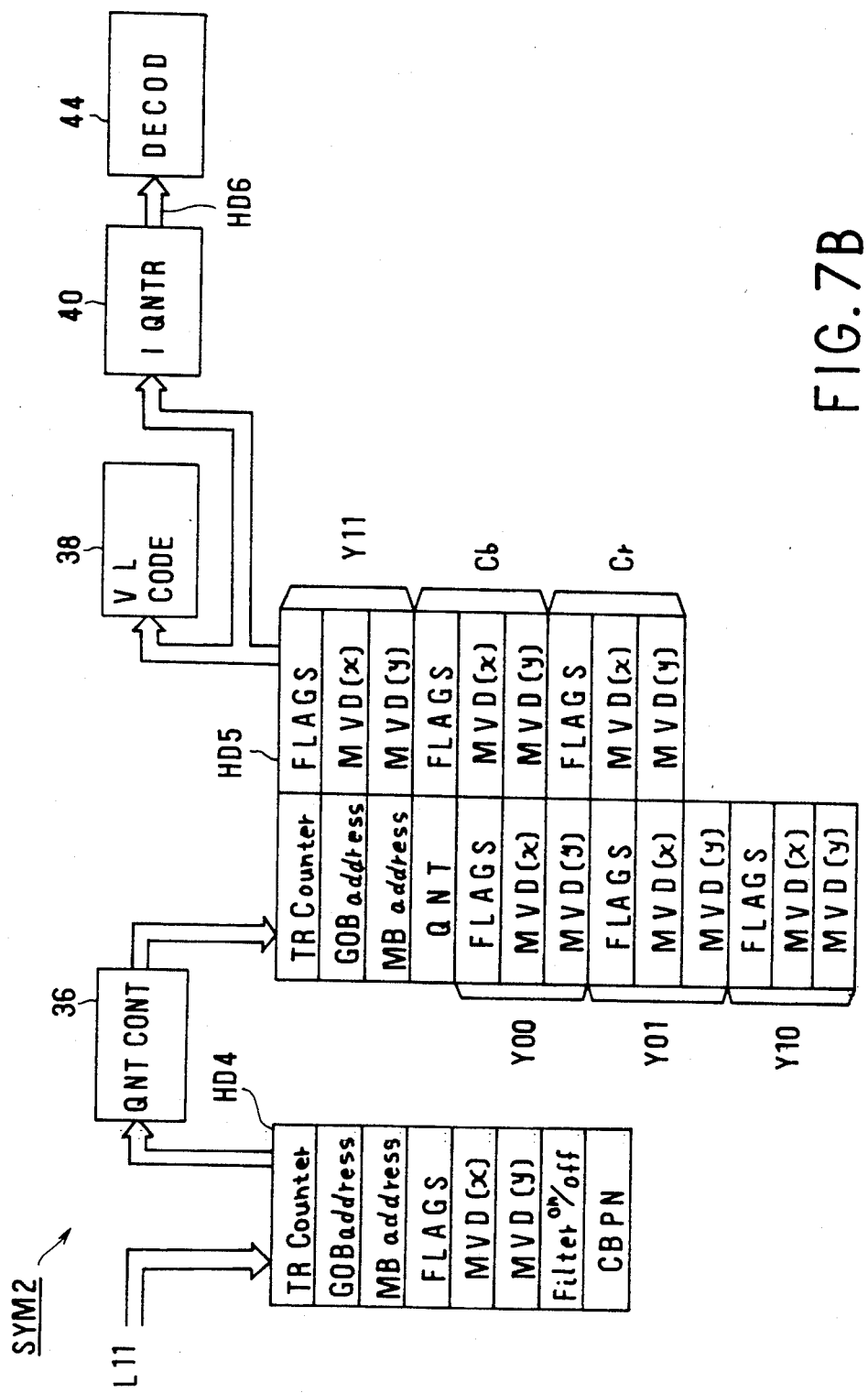

As shown in FIGS. 7A and 7B, the motion compensation control unit 26 identifies each macro block MB, which is sequentially transmitted to each processing step of the pixel data processing system SYM1, by providing the following data in the first header data HD1 for the macro block MB: transmission frame number data "TR Counter" representing a transmission sequence of the frame picture data FRM; block group number data "GOB address" representing the block group GOB (FIG. 6); macro block number data "MB address" representing the macro block MB among the block group GOB. Moreover, the motion compensation control unit 26 constructs flag data FLAGS indicating the processing type of the macro block MB to be processed, the motion vector data "MVD(x)" and "MVD(y)" of the macro block MB, and differential data "Σ |A−B|" which represents the evaluation.

Figure 8:
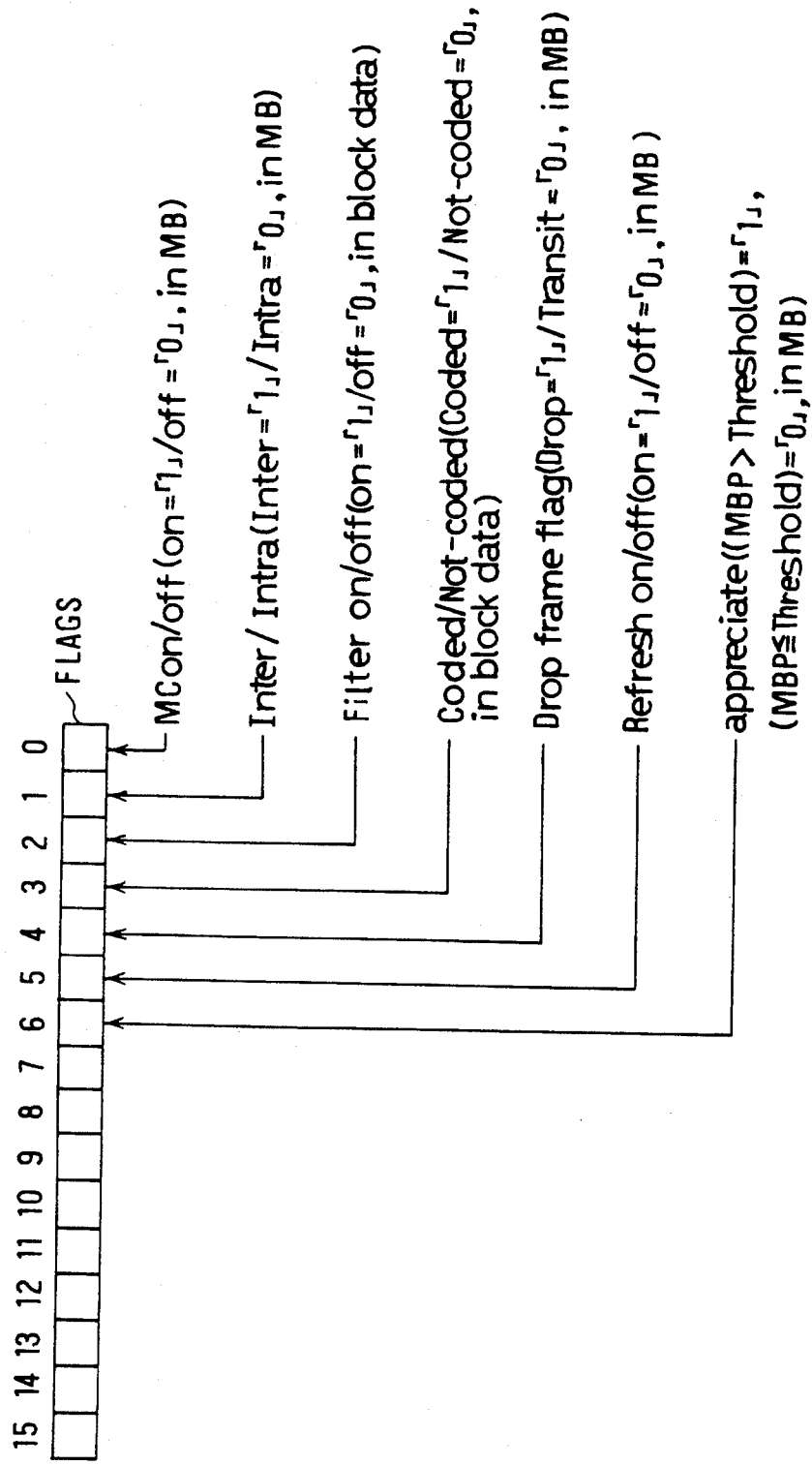
FIG. 8 is a schematic diagram showing the construction of the flag data of FIGS. 7A and 7B.

As shown in FIG. 8, the flag data "FLAGS" can have one word (16 bits) of flags at a maximum. A motion compensation control flag "MC on/off" which represents whether or not the macro block MB to be processed should be processed in motion compensation mode is set at bit 0.

At bit 1 of the flag data "FLAGS", inter-frame/intraframe flag "Inter/Intra" which represents whether the micro block MB to be processed should be in inter coding mode or in intra coding mode is set.

At bit 2 of the flag data "FLAGS", a filter flag "Filter on/off" which represents whether or not a loop filter 25B of the motion compensation circuit 25 is used is set.

At bit 3 of the flag data "FLAGS", a transmission flag "Coded/Not-coded" which represents whether or not block data $Y_{00}-C_r$ (FIG. 6) contained in the macro block to be processed should be sent can be set.

At bit 4 of the flag data "FLAGS", a drop frame flag "Drop frame flag" which represents whether or not the macro block MB to be processed is to be frame dropped can be set.

A bit 5 of the flag data "FLAGS", a forced refreshing flag "Refresh on/off" which represents whether or not the macro block MB to be processed is forcedly refreshed can be set.

At bit 6 of the flag data "FLAGS", a macro block power appreciation flag "MBP appreciate" may be set.

The differential data $\Sigma |A-B|$ represents a minimum value among differences between the macro block data "A" to be processed of current frame data S25 and macro block data "B" compensated by detection motion vectors of the predicted previous frame data S23, and enables appreciation of detected motion vectors.

In the inter coding mode the picture data coding circuit 28 feeds the current frame data S25, which is provided from the motion compensation circuit 25, as difference data S26 to a transform coding circuit 29 without any change (FIGS. 4A and 4B). On the other hand, in the intra coding mode difference data S26 which is the difference between the pixel data of the current frame data S25 and the pixel data of the predicted current frame data S24 is fed to the transform coding circuit 29.

In the header data processing system SYM2, an inter-/intra coding control unit 30 is provided to correspond to the picture data coding circuit 28. According to the first header data HD1, fed from the motion compensation control unit 26, and the operation data S31, supplied from the picture data coding circuit 28, the inter-/intra coding control unit 30 operates on data necessary for obtaining the inter-frame/intraframe flag "Inter/Intra" and the filter flag "Filter on/off" (FIG. 8) and sends the resulting data as a second header data HD2 to a filter control unit 31; the inter-frame/intra-frame flag "Inter/Intra" indicates the coding mode of the picture data coding circuit 28 whereas the filter flag "Filter" controls the operation of the loop filter 25B of the motion compensation circuit 25.

As shown in FIGS. 7A and 7B, the second header data HD2 takes over the data which constitutes the first header data HD1 (the transmission frame number data "TR Counter" to the differential data "$\Sigma |A-B|$"). Furthermore, in the inter/intra coding control unit 30, power data which is necessary to construct inter/intra coding mode switching signal S33 and filter on/off signal S34 in the filter control unit 31 is added to the second header data HD2, the power data including "$\Sigma(A)^2$ (L)" and "$\Sigma(A)^2$ (H)", "$\Sigma(A-B)^2$ (L)" and "$\Sigma(A-B)^2$ (H)" and "$\Sigma(A-FB)^2$ (L)" and "$\Sigma(A-FB)^2$ (H)", and "$\Sigma(A)$".

The power data "$\Sigma(A)^2$ (L)" and "$\Sigma(A)^2$ (H)" represent the lower bits and the upper bits of the sum of the squares of macro block pixel data "A" of the current frame data S25, respectively. The power data "$\Sigma(A-B)^2$ (L)" and "$\Sigma(A-B)^2$ (H)" represent the lower bits and the upper bits of the sum of the squares of the difference "A−B" of the macro block pixel data "A" of the current frame data S25 and macro block pixel data "B" of the predicted current frame data S24, which is constructed without passing through the loop filter 25B, respectively. The "$\Sigma(A-FB)^2$ (L)" and "$\Sigma(A-FB)^2$ (H)" represents the lower bits and the upper bits of the sum of the squares of the difference "A−FB" of the macro block pixel data "A" of the current frame data S25 and macro block pixel data "FB" of the predicted current frame data S24, which is constructed through the loop filter 25B, respectively. The "$\Sigma(A)$" represents the sum of the macro block pixel data "A" of the current frame data S25. To evaluate the magnitude of each data to be processed, the amount of the data is expressed in power value (each sum of the squares is obtained as a value irrespective of sign).

According to the second header data HD2 fed from the inter/intra coding control unit 30 and residual amount data S32 fed from a transmission buffer memory 32, the filter control unit 31 sends an inter/intra coding mode switching signal S33 to the picture data coding circuit 28 and a filter on/off signal S34 to the loop filter 25B, and furthermore the filter control unit 31 adds the filter flag "Filter on/off", representing the contents of the filter on/off signal S34, to the second header data HD2 and hands over the resulting data as third header data HD3 to a threshold control unit 35.

Here, the filter control unit 31 first controls the picture data coding circuit 28 to the intra coding mode when inter coded transmission data would be larger than intra coded transmission data.

Secondly, according to the filter on/off signal S34 the filter control unit 31 controls the loop filter 25B not to perform the filtering operation when during the processing in the inter coding mode, the differential data based on the predicted current frame data S24 which has not been processed in the loop filter 25B is smaller than the differential data based on the predicted current frame data S24 which has been processed there.

Thirdly, the filter control unit 31 switches the picture data coding circuit 28 to the intra coding mode according to the inter/intra coding mode switching signal S33 in the forced refreshing mode.

Fourthly, the filter control unit 31 detects a state in which the transmission buffer memory 32 is liable to overflow based on the residual amount data S32 provided from the transmission buffer memory 32 and thereby sends to the threshold control unit 35 the third header data HD3 which contains a flag to command that a frame dropping procedure be executed.

Thus, the picture data coding circuit 28 supplies to the transform coding circuit 29 difference data S26 which has been encoded in such a mode that the difference between the current frame data S25 and the predicted current frame data S24 is minimized.

As shown in FIGS. 7A and 7B, the third header data HD3 takes over transmission frame number data "TR Counter" to motion vector data "MVD(x)" and "MVD(y)" from the second header data HD2, and the filter control unit 31 adds 6 bits of filter flag "Filter on/off" which correspond to the data blocks $Y_{00}$ to $C_r$ to the third header data HD3.

The transform coding circuit 29 is a discrete cosine transform circuit and sends to a transmission block setting circuit 34 transformation code data S35 which is obtained by zigzag scanning discrete cosine transformed coefficients for each of the six blocks $Y_{00}$, $Y_{01}$, $Y_{10}$, $Y_{11}$, $C_b$ and $C_r$.

The transmission block setting circuit 34 computes the sum of squares of coefficient data in the number of n from the leading data about each of the six data blocks $Y_{00}$ to $C_r$ (FIG. 6) and hands over the result of the operation as power detection data S36 to the threshold control unit 35.

Then the threshold control unit 35 compares the power detection data S36 of each data block $Y_{00}$ to $C_r$ with a predetermined threshold and thereby constructs 6 bits of transmission permitted/not-permitted data "CBPN" which represents that the data block is not permitted to be transmitted when the power detection data S36 is smaller than the threshold whereas the block data is permitted to be transmitted when the power detection data S36 is larger than the threshold. This data is added to the third header data HD3 which has been received from the filter control unit 31. The threshold control unit 35 hands over the resulting data to a quantization control unit 36 as fourth header data HD4 and controls the transmission block setting circuit 34 to send corresponding data blocks $Y_{00}$ to $C_r$ as transmission block patterning data S37 to a quantizer 37.

Here, as shown in FIGS. 7A and 7B the fourth header data HD4 takes over the transmission frame number data "TR Counter" to filter flag "Filter on/off" of the third header data HD3, and 6 bits of the transmission permitted/not-permitted flag "CBPN", which has been generated at the threshold control unit 35 to correspond to the blocks $Y_{00}$ to $C_r$, is added to the fourth header data HD4.

Figure 9A:
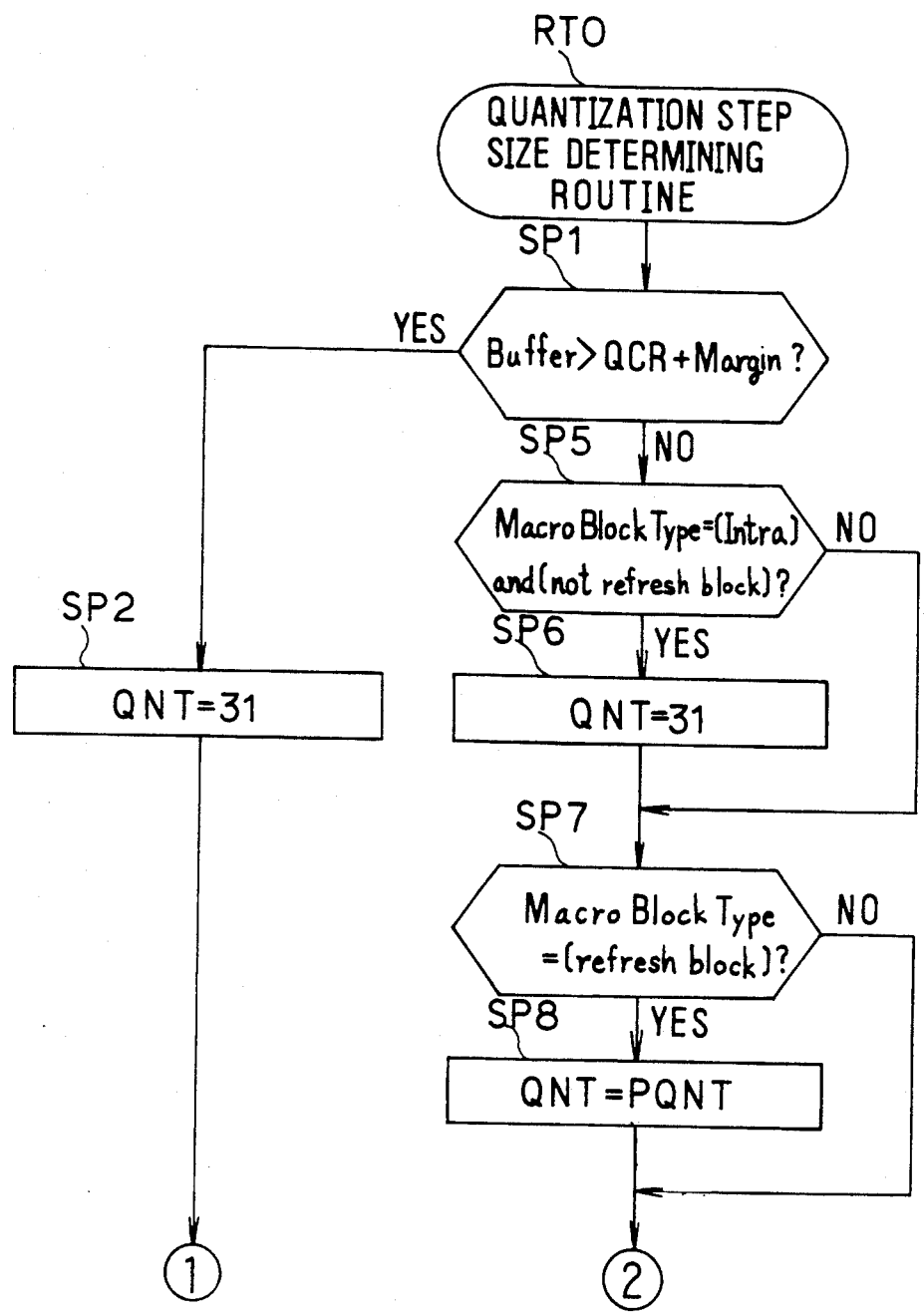
FIGS. 9A and 9B are flow charts showing the quantization stepsize determining routine of the quantization control unit 36 of FIG. 4B.
Figure 9B:
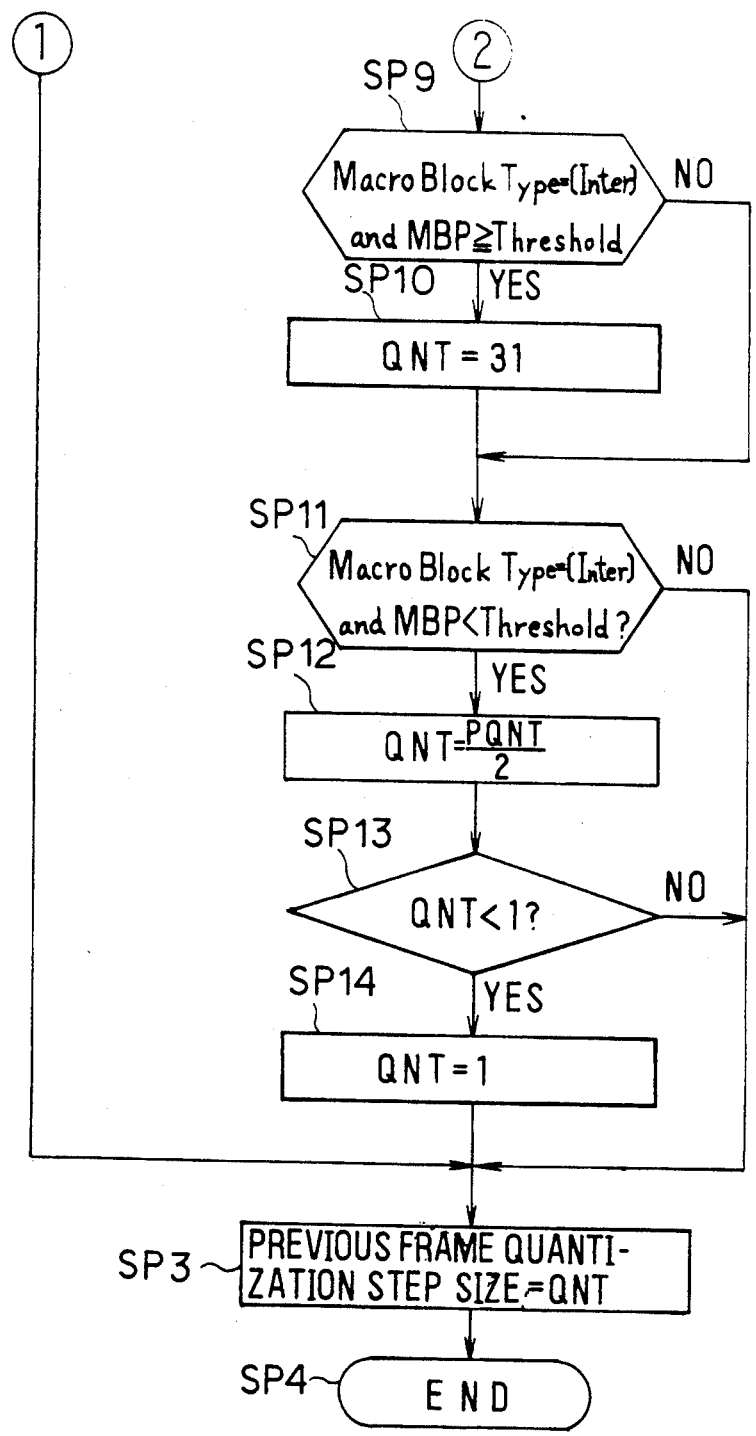

On the basis of the fourth header data HD4 handed over from the threshold control unit 35 and the residual amount data S32 sent from the transmission buffer memory 32, the quantization control unit 36 performs a quantization step size determination routine RTO shown in FIGS. 9A and 9B, and thereby provides a quantization step size control signal S38 to the quantizer 37, thus causing the quantizer 37 to perform the quantization procedure at the quantization step size appropriate for the data contained in the macro block MB. Consequently, quantized picture data S39 which has been obtained at the output terminal of the quantizer 37 is fed to a variable length coding circuit 38.

In addition to this, based on the fourth header data HD4 the quantization control unit 36, as shown in FIGS. 7A and 7B, constructs as header data HD5 data in which the flag data "FLAGS" and the motion vector data "MVD(x)" and "MVD(y)" are separated and arranged in series to correspond to each of the data blocks $Y_{00}$ to $C_r$ (FIG. 6), and the quantization control unit 36 hands the header data HD5 to the variable length coding circuit 38 and an inverse quantizer 40.

As shown in FIGS. 7A and 7B, the header data HD5 takes over the transmission frame number data "TR Counter" to the macro block MB address in the fourth header data HD4 without any change, and the quantization control unit 36 adds quantization size data "QNT" and flag data "FLAGS" for the data blocks $Y_{00}$ to $C_r$ and motion vector data $MVD(x)$ and $MVD(y)$ to the header data HD5.

The Variable length coding circuit 38 performs variable length coding on the header data HD5 and the quantized picture data S39 to construct transmission picture data S40, which is supplied to the transmission buffer memory 32.

In variable length coding the data blocks $Y_{00}$ to $C_r$, the variable length coding circuit 38 performs processing to throw away the data without sending it as transmission picture data S40 when "frame dropping" or "transmission not permitted" is instructed according to the corresponding flag data "FLAGS".

The transmission buffer memory 32 stores the transmission picture data S40, which is read out at a predetermined transmission rate and is combined with transmission voice data S41, sent from a voice data generator 42, in the multiplexer 41 to be sent to the transmission line 43.

The inverse quantizer 40 inverse quantizes the quantized picture data S39, sent from the quantizer 37, according to the header data HD5, and then feeds the inverse quantization data S42 to inverse transform coding circuit 43 for conversion to inverse transform coded data S43, which is then fed to a decoder circuit 44. Thus, coded differential data S44 which represents the picture information sent as the transmission picture data S40 is supplied to the predicted previous frame memory 27.

Next, the predicted previous frame memory 27 modifies the predicted previous frame data stored using the coded differential data S44 to store new predicted previous frame data.

Thus, in the encoder 21A of the configuration in FIGS. 4A and 4B, the pixel data processing system SYM1 pipelines pixel data in the unit of a macro block MB according to the header information fed from the header data processing system SYM2. Simultaneously, the header data is transferred in the header data processing system SYM2, and thereby the pixel data is appropriately processed by performing addition or deletion of the header data in each step of the header data processing system SYM2.

As shown in FIG. 5, in the decoder 21B the transmission data transmitted from the encoder 21A through transmission line 43 is accepted in a transmission buffer memory 52 through a demultiplexer 51 while transmission voice data S51 is received in a voice data receiving unit 53.

The pixel data received in the transmission buffer memory 52 is separated into received picture data S52 and header data HD11 in a variable length inverse transform circuit 54. The received picture data S52 is inverse quantized to form inverse quantized data S53 in an inverse quantizer 55, and is then inverse transformed to inverse transform coded data S54 by discrete inverse transformation in an inverse transform coding circuit 56.

The inverse transform coded data S54 is fed to a decoder circuit 57 together with header data HD12 constructed in the inverse quantizer 55, and is then stored as coded differential data S55 in a frame memory 58.

Thus, the pixel data transmitted is decoded in the frame memory 58 on the basis of the coded differential data S55. In a digital/analog conversion circuit 59, the decoded picture data S56 is converted to an analog signal, which is then outputted as an output video signal $VD_{OUT}$ through an output circuit unit 60.

(2) Procedure to Determine the Quantization Step Size

The quantization control unit 36 executes the quantization step size determining routine RT0, shown in FIGS. 9A and 9B, on each macro block MB, and thereby a quantization step size QNT is selected to adapt to the coding format of picture data of the macro block MB to be currently processed (referred to as the macro block type) to feed as the quantization step size control signal S38 to the quantizer 37. In this manner, the quantizer 37 is controlled so as not to produce a disturbance of the picture according to the type of macro blocks.

Figure 10:
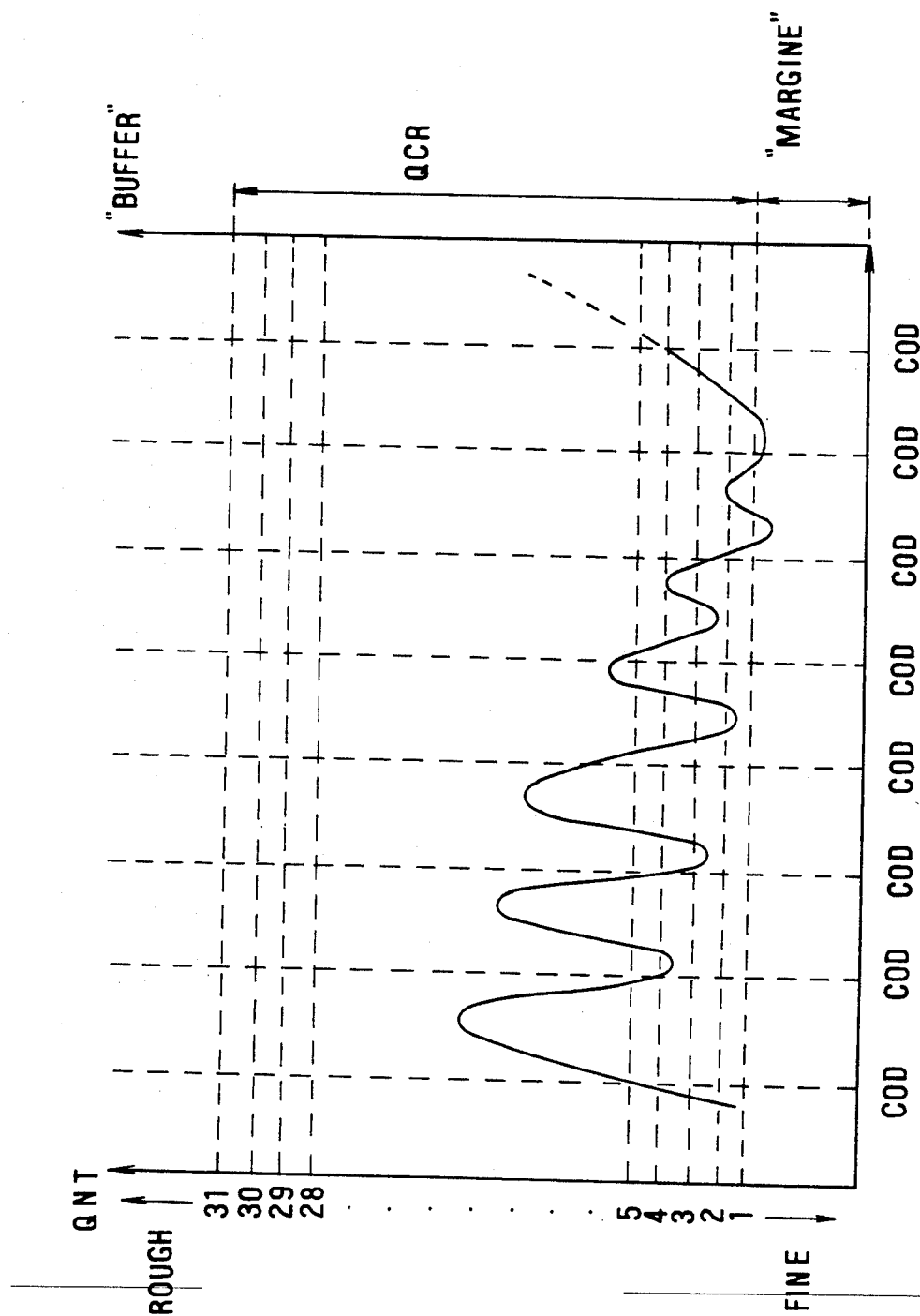
FIG. 10 is a graph illustrating changes of residual data in the transmission buffer memory 32 of FIG. 4B.

In this embodiment, the quantizer 37 is, as shown in FIG. 10, designed so that the quantization step size QNT is stepwise variable from an upper limit QNT=31 to a lower limit QNT=1. The quantization control unit 36 performs an adaptive control in response to the macro block type "Macro Block Type" so that the data residual amount "Buffer" of the transmission buffer memory 32 falls within the variable control range of the quantization step size QNT, that is, the range of the quantization size controllable range QCR.

(2-1) Processing in a Case where the Amount of the Residual Data is Excessive When entering the quantization step size determining routine RT0 of FIGS. 9A and 9B, in the step SP1 the quantization control unit 36 makes a judgement as to whether or not the data residual amount "Buffer" of the transmission buffer memory 32 is larger than the sum of the margin "Margin" and the quantization size controllable range QCR.

When an affirmative result is obtained, the data residual amount "Buffer" of the transmission buffer memory 32 is above the upper limit. In this case, the quantization control unit 36 proceeds to the step SP2, where it supplies the quantization step size control signal S38 to set the quantization step size QNT to the maximum, i.e., QNT=31, to the quantization control unit 36, and then goes to the step SP3, where the value of the quantization step size QNT currently set is stored as the previous frame quantization step size PQNT.

Thus, the quantization control unit 36 completes the quantization step size determining routine RT0 at the step SP4, and thereby the transform code data S35 is quantized at the roughest quantization step size in the quantizer 37.

As a result, the amount of quantized picture data S39 generated in the quantizer 37 is controlled to the smallest level so that the data residual amount "Buffer" of the transmission buffer memory 32 decreases.

This operation is repeated until a negative result is obtained at the step SP1, which occurs when the residual data in the transmission buffer memory 32 becomes smaller than the sum of the margin "Margin" and the quantization size controllable range QCR, QCR+Margin.

(2-2) Processing in the Intra Coding Mode

In such a state, the quantization control unit 36 goes to the step SP5 since a negative result is obtained in the step SP1, and in that step it is determined whether the macro block type ("Macro Block Type") is an intra coded block and not a forced refresh block ("not refresh block").

Here, the macro block type "Macro Block Type" is, as shown in FIG. 8, represented by bit 2, bit 1 and bit 0 of the flag data "FLAGS" contained in the header data HD4 supplied by the threshold control unit 35 to the quantization control unit 36. When these bits are "010", the macro block type is an intra coding type. When "000", the macro block type is an inter coding type. When "001", the macro block type is a motion compensated not filtered type "MC-not filtered". When "101", the macro block type is a motion compensated filtered type "MC filtered".

When in the step SP5, an affirmative result is obtained, the flag data "FLAGS" is "000" at bit 2, bit 1 and bit 0 thereof and the forced refreshing flag "refresh" at bit 4 is in the state of logic "0".

Such a state means that the current frame has been greatly changed from the previous frame to such a degree that the macro block type "Macro Block Type" needs to be intra coded. Moreover, the current state is not in the forced refreshing mode.

If under such conditions, quantization is carred out at a fine quantiziation step size in the quantizer 37, the amount of the quantized picture data S39 generated from the quantizer 37 becomes extremely large, and hence it is likely that the transmission buffer memory 32 will entually overflow.

Therefore, the quantiziation control unit 36 goes to the step SP6, where the quantization step size QNT is set to the upper limit QNT=31. Thus, the amount of the quantized picture data S39 generated from the quantizer 37 is restrained so that overflowing of the transmission buffer memory 32 is avoided.

On the contrary, if a negative result is obtained in the step SP5, this means that the object to be projected is either not an intra coding type or is an intra coding type generated as the result of forced refreshing. In this case, the quantization control unit 36 does not execute the step SP6 but skips this step.

(2-3) Processing in the Forced Refreshing Mode

Subsequently, in the step SP7 the quantization control unit 36 determines whether or not the macro block to be processed is a forced refreshing type block.

When an affirmative result is obtained in this step, it indicates that forced refreshing should be performed. I this case, the quantization control unit 36 proceeds to the step SP8, where the previous frame quantization step size PQNT which has been used as quantization step size QNT in the previous quantization is set. Thus, quantization is carried out at the same quantization step size as in the previous frame when it is determined that forced refreshing should be performed.

This enables the quality of the picture not to change to such a degree that it creates an eye-sore in effect when the forced refreshing is performed.

The forced refreshing is executed in a predetermined cycle irrespective of the contents of the picture, and hence if the quantization step size changes as compared to that of the previous frame even though the contents of the picture does not change, an eye-sore could be created in many cases.

If the quantization step size is not changed when the forced refreshing mode is indicated, it is possible to produce no change in the picture which would create an eye-sore as a result of the refresh.

It is to be noted that the same effect as described above can be achieved by selecting a smaller value in place of using the same value as the previous quantization step size.

The quality of a reproduced picture is degraded by enlarging the quantization step size when forced refreshing is indicated without any change in the picture. On the contrary, a slight reduction of the quantization step size somewhat improves the quality of the reproduced picture, and thereby it is possible that any change of picture is not noticed.

When in the step SP7 a negative result is obtained, the forced refreshing is not currently indicated. In this case, the quantizer 37 does not perform any procedure in the step SP8 but skips the step.

(2-4) Processing in a Case where the Differential Data is Large in Power

Subsequently, in the step SP9 the quantization control unit 36 determines whether or not the macro block type is the inter coding type and the macro block power MBP is larger than a predetermined threshold "Threshold".

Here, the macro block power MBP is defined as:

$$MBP = \sum_{i=1}^{n} (Coeff(i))^2 \qquad (1)$$

When an affirmative result is obtained in the step SP9, it is in a state that there is produced any change such that the quality of the reproduced picture will not be significantly degraded even if the picture data of the macro block MB is quantized at a somewhat rough quantization step size and then transmitted, since the picture data, that is, the macro block power MBP of the differential data is large.

When a macro block which meets such conditions is discrete cosine transformed in the transform coding circuit 29, the quantization control unit 36 proceeds to the step SP10, where it sets the quantization step size QNT to the roughest value, that is, the upper limit QNT=31.

When transform code data S35 of a macro block with a macro block power MBP less than the threshold "Threshold" is sent, the quantization control unit 36 skips the step SP10.

The macro block power MBP defined by the equation (1) aims to determine the wight of each macro block on the basis of the discrete cosine transform coefficient Coeff(i) which is obtained as a result of the discrete cosine transformation in the transform coding circuit 29. The weight of the discrete cosine transform coefficient represents the intensity of a transmission signal which has been obtained by the discrete cosine transformation. A large macro block power MBP thus means that the intensity of the transmission signal is large, and hence even if the transmission signal is sent with some compression, the transmitted information can be reconstructed at the receiving end without being influenced by external noise.

In such a case, the quantization control unit 36 compresses the amount of the quantized picture data S39, which is generated in the quantizer 37, by changing the quantization step size QNT to a larger value, and thereby reducing the load on the transmission line 43.

Incidentally, the discrete cosine transform circuit which constitutes the transform coding circuit 29 performs discrete cosine transformation according to the following equation:

$$F(u, v) = \frac{1}{4} C(u)C(v) \sum_{x=0}^{n} \sum_{y=0}^{n} f(x, y) \qquad (2)$$

$$\cos\left[(2x+1) \cdot \mu \cdot \frac{\pi}{16}\right] \cos\left[(2y+1) \cdot v \cdot \frac{\pi}{16}\right]$$

The inverse discrete cosine transform circuit which constitutes the inverse transform coding circuit 56 performs inverse discrete cosine transformation according to the following equation:

$$f(x, y) = \frac{1}{4} \sum_{x=0}^{n} \sum_{y=0}^{n} fC(u)C(v)F(u, v) \qquad (3)$$

$$\cos\left[(2x+1) \cdot \mu \cdot \frac{\pi}{16}\right] \cos\left[(2y+1) \cdot v \cdot \frac{\pi}{16}\right]$$

where x and y represent coordinates of pixels in the macro block (the upper left corner has a coordinate (0, 0)); and u and v represent coordinates of coefficients in the discrete cosine transformation.

When u and v equal zero, $$C(u)C(v) = \frac{1}{\sqrt{4}} \qquad (4)$$

and in the other cases, $$C(u)C(v) = 1 \qquad (5)$$

Suppose that X is a picture data matrix in a macro block and C is a transform matrix when discrete cosine transformation is carried out. In the transformation according to equation S(2) in the transform coding circuit 29 a picture data matrix X is horizontally transformed to produce a transformed picture data matrix $XC^{-1}$, and then undergoes vertical transformation to obtain a transformed picture data matrix $C(X)C^{-1}$.

The transformed picture data matrix $C(X)C^{-1}$ thus obtained is, as illustrated in FIG. 12, expressed as an 8×8 transformation coefficient matrix including coefficients Coeff(1), Coeff(2), Coeff(3), . . . and Coeff(64), and each coefficient Coeff(i) (i=1 to 64) of the transform coefficient matrix is read from the transform matrix by scanning in the order of i=1, 2, 3, . . . 64 over time.

Thus, the picture data of one macro block is transformed to transform coefficients Coeff(i) (i=1 to 64) which constitutes the transform matrix, and these transform coefficients are fed as transmission data arranged in series over time to the quantizer 37.

Thus, the transform coefficient data series Coeff(1), Coeff(2), . . . and Coeff (64) fed to the quantizer 37 represents not only information to be sent but the intensity of signals to be transmitted. As defined by equation (1), the sum of the squares of transform coefficient data (i=1 to n) contained in the transform coefficient data series Coeff(i) (i=1, 2, . . . 64) is obtained so that the signals to be sent become horizontally and vertically equal in intensity. Thus, equation (1) defines this quantity as the macro block power MBP.

When the transform coefficient matrix as shown in FIG. 12 is obtained in practice by discrete cosine transformation of pixel data, there is a tendency that power is concentrated at the transform coefficients Coeff(i) at the upper left corner, that is, the lower degree transform coefficients whereas significant information is not produced in the transform coefficients at the lower right corner, that is, the higher degree transform coefficients. In this manner, compression of transmission data can be achieved by discrete cosine transformation.

If it is determined that a macro block power MBP obtained according to equation (1) is larger than the predetermined threshold "Threshold" when it has been also determined in the step SP9 of FIG. 9B that the macro block type "Macro Block Type" is the inter coding type, then the differential data in the macro block MB is sufficiently large. Thus, rough quantization is sufficient. If the quantization step size QNT is selected to the upper limit in the step SP10 according to such a determination, the differential data is transmitted as a relatively small amount of data.

(2-5) Processing in the Inter Coding Mode

When in the step SP11 of FIG. 9B, it is determined that the macro block type "Macro Block Type" is the inter coding type, and that the macro block power MBP is smaller than the predetermined threshold "Threshold", the quantization control unit 36 proceeds to the step SP12, where the quantization step size QNT is set to $\frac{1}{2}$ of the previous quantization step size PQNT used in the previous frame. Then, in the step SP13 it is determined whether or not the quantization step size QNT is smaller than the lower limit QNT=1. When the quantization step size QNT is smaller than the lower limit, it is reset to the lower limit in the step SP14.

Here, as described in connection with equation (1) the macro block power MBP represents the intensity of the differential data signal of the macro block, and hence when an affirmative result is obtained in the step SP11, the low value of the macro block power MBP indicates that the difference is small, and that the picture has a small change in content from the previous frame.

Thus, in the step SP12 the quantization control unit 36 reduces the value of the previous quantization step size PQNT of the previous frame by a factor of $\frac{1}{2}$, and the resultant value is set as the quantization step size QNT of the current frame. In this manner, the quantization step size is made finer as a result of the fact that the change in the current frame as compared to the previous frame is small, and the optimum quantization step size can be thus obtained.

The quantization control unit 36 repeats such reduction of the quantization step size in the steps SP11 and SP12 while pictures with small changes follow, and hence in the case where transmission of pictures with small changes continue, the quantization step size converges toward the minimum value.

Then, in the steps SP13 and SP14 the quantization step size QNT is controlled to be no smaller than 1, and, therefore, in the case where pictures with small changes are sent the quantization control unit 36 can thereby converge the quantization step size QNT to the lower limit.

In the case where a negative result is obtained in the step SP11, the quantization control unit 36 determines that the picture to be currently sent has a large change from the previous frame, and therefore skips the steps SP12, SP13 and SP14.

(2-6) The Operation of the Quantization Control Unit 36

In the first case where the data residual amount "Buffer" of the transmission buffer memory 32 exceeds the upper limit (QCF+Margin), the quantization control unit 36 detects this in the step SP1 and sets the quantization step size QNT of the quantizer 37 to the upper limit QNT=31 in the step SP2, so that the data residual amount "Buffer" of the transmission buffer memory 32 is reduced to thereby keep it in a state below its upper limit.

In the second case where data for which the macro block type "Macro Block Type" is the intra coding type and not a forced refreshing type is provided to the quantizer 37, the quantization control unit 36 determines this in the step SP5 and sets the quantization step size QNT of the quantizer 37 to the upper limit QNT=31 in the step SP6 so that the transmission buffer memory 32 does not overflow.

When negative results are subsequently obtained in respective steps SP7, SP9 and SP11, the quantization control unit 36 sets the previous frame quantization step size PQNT to the values of the quantization step size which has been set in the step SP6 in the step SP3 and then completes the routine.

In the third case where macro block data of the forced refreshing block type is provided to the quantizer 37, in the quantization step size determining routine RTO the quantization control unit 36 determines this by the loop of the steps SP1-SP5-SP7. The quantization control unit 36 sets the quantization step size QNT of the quantizer 37 to the value of the previous frame quantization step size PQNT in the step SP8 and thereby controls the quality of the picture to be sent to by the same as the picture of the previous frame in the forced refreshing mode so that any change in quality which would create an eye-sore is not produced in the forced refreshing mode.

In this case, the quantization control unit 36 obtains negative results in respective steps SP9 and SP11, and thus the previous frame quantization step size PQNT is set to the value of the quantization step size QNT which has been set in the step SP8 in the step SP3 and then the routine is completed.

In the fourth case where picture data of a macro block with a large macro block power MBP is provided to the quantizer 37, in the quantization step size determining routine RTO the quantization control unit 36 determines this by the loop of the steps SP1-SP5-SP7-SP9. Then, the quantization control unit 36 sets the quantization step size QNT of the quantizer 37 to the upper limit QNT=31, and thereby holds the amount of data generated in the quantizer 37 to a minimum. This enables the picture data to be transmitted with much improved efficiency.

After these steps, the quantization control unit 36 obtains a negative result in the step SP11 and thus sets the previous frame quantization step size PQNT to the value of the quantization step size QNT, which has been set in the step SP10, in the step SP3. Then, the routine is completed.

In the fifth case where macro block data which is of the inter coding type with a small macro block power MBP is fed to the quantizer 37, in the quantization step size determining routine RTO the quantization control unit 36 determines this by the loop of the steps SP1-SP5-SP7-SP9-SP11. Then, in the step SP12 the quantization step size QNT is set to $\frac{1}{2}$ of the value of the previous frame quantization step size PQNT and thereby the quantization step size is converged toward the lower limit QNT=1.

Thus, the quantization step size which is most suitably applied to the macro block power MBP can be used.

(3) Modifications of the First Embodiment (3-1) Although it has been stated that the quantization step size QNT is set to the upper limit QNT=31 in the steps SP6 and SP10 in FIGS. 9A and 9B, the quantization step size QNT is not limited to that upper limit and may be set to other values. It is preferable, however, that a rough quantization value which enables rough quantization is selected.

(3-2) It has been stated that the same threshold "Threshold" is used for assessing the magnitude of the macro block power MBP in the steps SP9 and SP11 of FIG. 9B. By selecting a different value in place of this, in effect similar to the case described above can be achieved.

(3-3) It has been further stated that in computing the quantization step size QNT from the previous frame quantization step size PQNT in the step SP12 in FIG. 9B, a value of ½ of PQNT is used. The ratio is not restricted to ½ but may be changed to different values. It is preferable, however, that the quantization step size is set to a value which is obtained by reducing the previous frame quantization step size by a predetermined ratio.

(3-4) It has been stated that the quantization step size QNT is converged toward the lower limit QNT=1 in the steps SP13 and SP14 of FIG. 9B. However, the convergence value is not limited to that lower limit but may be set to different values.

(4) Frame Dropping in the Embodiment

In the picture information transmission system 21 shown in FIGS. 4A and 4B, the transmission buffer memory 32 feeds back the residual amount data S32 representing data residual amount "Buffer" to the quantization control unit 36, and thereby the transmission buffer memory 32 is controlled so as to avoid the overflow or underflow of data by the changing of the quantization size data QNT in the quantization of the quantizer 37.

Figure 13:
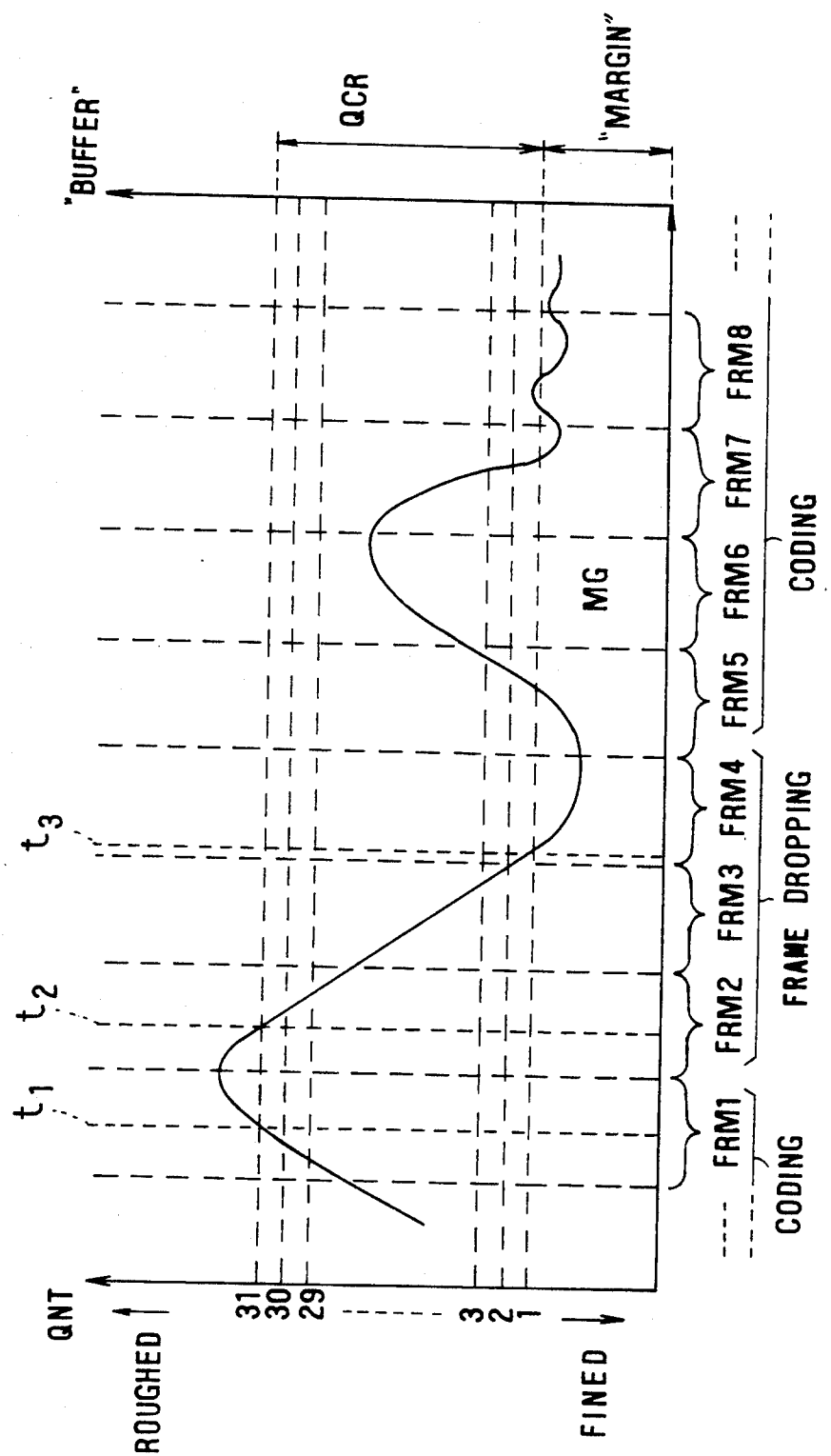
FIG. 13 is the characteristic curve illustrating changes of the data residual amount of the transmission buffer memory due to the frame dropping according to the second embodiment of the present invention.

More specifically, in the second embodiment the quantizer 37 is as shown in FIG. 13 variable in steps of the quantization size data QNT, from an upper limit QNT=31 to a lower limit QNT=1. In a case where the data residual amount "Buffer" of the transmission buffer memory 32 approaches the sum of the margin "Margin" and the quantization size controllable range QCR (the permissible upper limit of the data residual amount), the quantization size data QNT is set to a higher value, resulting in a rougher quantization (that is, changed toward QNT=31).

Accordingly, the quantized picture data S39 is controlled to a small amount of data by carrying out quantization of the transformation code data S35 with the rough quantization step size, and thereby the data residual amount "Buffer" of the transmission buffer memory 32 decreases.

On the contrary, when the data residual amount of the transmission buffer memory 32 becomes small, the quantization control unit 36 changes the QNT to a lower value, resulting in a fine quantization (that is, toward QNT=1), and thereby controls the data residual amount "Buffer" of the transmission buffer memory 32 to converge to the level of a desired value MG (QNT=1).

The residual amount data S32 fed back from the transmission buffer memory 32 is inputted to the filter control unit 31, and thereby the filter control unit 31 decides whether or not to execute frame dropping in the unit of a field, continually monitoring the data residual amount "Buffer" of the transmission buffer memory 32.

More specifically, the filter control unit 31 decides that the transmission buffer memory 32 comes close to an overflow state at a time t1 (FIG. 13) when the amount of the transformation code data S35 generated increases and exceeds the upper limit (margin "Margin"+quantization size controllable range QCR) over which the data residual amount "Buffer" of the transmission buffer memory 32 is not sufficiently controllable by the quantizer 37. The filter control unit 31 thus sets the drop frame flag "Drop frame flag" (FIG. 8) to "1"; the drop frame flag is contained in flag data "FLAGS" of second header data HD2 of each macro block MB corresponding to one field of pixel data of the subsequent frame FRM2. This drop frame flag is successively transferred to the third, fourth and fifth header data HD3, HD4 and HD5, and is thereby sent to the variable length coding circuit 38 and the inverse quantizer 40.

In the case where the drop frame flag "Drop frame flag" which is contained in the flag data "FLAGS" of the header data HD5 inputted to the variable length coding circuit 38 is set to "1", the variable length coding circuit 38 does not code the quantized picture data S39, and thereby does not send the transmission picture data S40.

In this manner, the threshold control unit 35 sets the drop frame flag "Drop frame flag" to "1" for every macro block MB of the second frame FRM2, and thereby the frame FRM2 is frame dropped by controlling the variable length coding circuit 38 to not send the transmission picture data S40 of every macro block MB of the frame FRM2.

Thus, when the transmission buffer memory 32 is in a state in which the data residual amount "Buffer" exceeds the upper limit, the data residual amount "Buffer" decreases by the amount of data outputted to the transmission line 43 since the one frame of data is not inputted.

Correspondingly, the inverse quantizer 40 does not inverse quantize quantized picture data S3 inputted to correspond to header data HD5 when the drop frame flag "Drop frame flag" of the header data HD5 inputted is set to "1".

Accordingly, every macro block MB of the frame FRM2 for which frame dropping is indicated is not outputted as inverse quantization data S42, so that the data of the frame FRM2 is frame dropped from predicted previous frame data which is to be newly stored in the predicted previous frame memory 27.

Thus, in the predicted previous frame memory 27 the pixel data also undergoes frame dropping corresponding to the frame dropping of the pixel data outputted through the transmission buffer memory 32.

After starting the frame dropping operation according to the data residual amount "Buffer" of the transmission buffer memory 32, the filter control unit 31 continues to indicate frame dropping until the data residual amoung "Buffer" decreases below the desired residual value MG.

Accordingly, the frame dropping is continued even when the data residual amount "Buffer" of the transmission buffer memory 32 drops below the upper limit at time $t_2$ (FIG. 13). When the data residual amount "Buffer" is below the desired value MG in the fourth frame FRM4 at time $t_3$, the transmission buffer memory 32 sets the drop frame flag "Drop frame flag" of header data, corresponding to the subsequent frame FRM5, to "0" after frame dropping of every macro block MB of the frame FRM4 is completed. Thus, variable length coding of quantized picture data S39 is restarted for the frame picture data FRM5.

Accordingly, the data residual amount "Buffer" of the transmission buffer memory 32 changes depending on the amount of inputted and outputted data as a result of the inputting of data from the transmission picture data S40 for this frame FRM5 to the transmission buffer memory 32.

Thus, the transmission buffer memory 32 resets the drop frame flag "Drop frame flag" which corresponds to every macro block MB in a frame to "0" unless the data residual amount "Buffer" exceeds the upper limit again, so that transmission picture data S40 is inputted to the transmission buffer memory 32 and the data residual amount "Buffer" changes accordingly.

Even if the amount of the transmission picture data S40 generated rapidly increases after this, frame dropping is not restarted at once since in the transmission buffer memory 32 the data residual amount "Buffer" has been reduced to the desired value MG.

Thus, the situation in which transmitted frames and non-transmitted frames are repeated every other frame is avoided, and hence video images which are obtained by reproducing pixel data outputted from the transmission buffer memory 32 do not deteriorate with respect to their smoothness of movement.

Because the data residual amount "Buffer" is reduced to the desired value MG (QNT=1) by frame dropping, the data residual amount "Buffer" can be converged at the desired value MG (QNT=1) in much shorter time in the case where, for example, the amount of the transmission picture data S40 generated is reduced in the subsequent frame FRM6. In this case, the data residual amount "Buffer" has not yet increased to the upper limit.

When a swiftly moving picture (that is, a picture with a large amount of transmission picture data rapidly changes to a slow picture (that is, a picture with a small amount of transmission picture data, the quantization step is controlled to a fine quantization (QNT=1) in a short time, and thereby fine picture expression can be achieved quickly when the movement of the picture becomes slow.

It is to be noted that the degradation in quality of swiftly moving picture of rough quantization cannot be recognized, but that of a slowly moving picture of rough quantization can be. Thus, visual deterioration of picture quality can be avoided by quickly changing the quantization step size to a fine quantization when the movement in the picture slows down.

Figure 14:
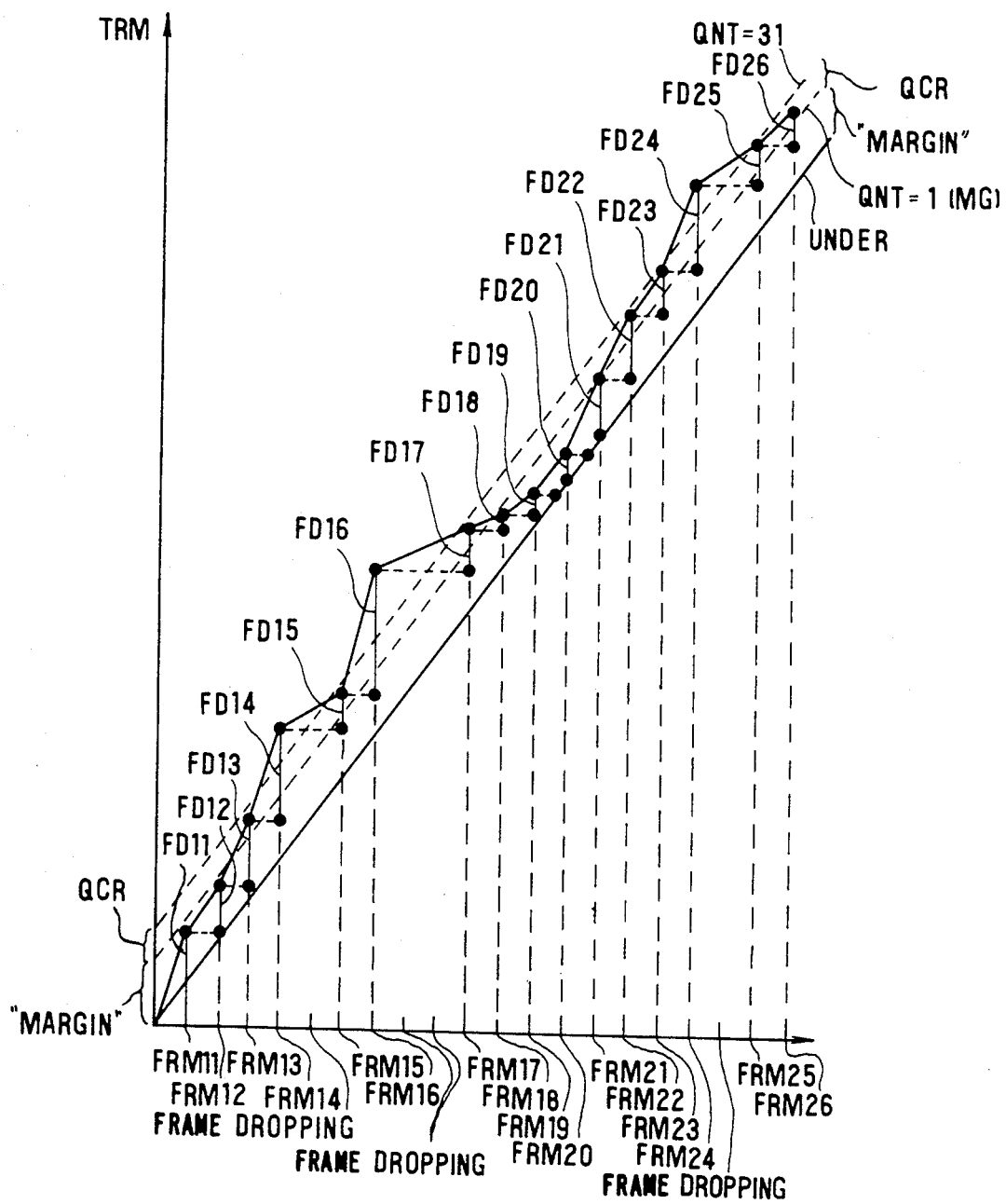
FIG. 14 is a graph illustrating the accumulated value of the transmission picture data inputted to the transmission buffer memory.

FIG. 14 illustrates an accumulated value TRM of the amount of transmission picture data (that is, variable length coded data), inputted to the transmission buffer memory 32, as of each frame; FD11 to FD26 designate the amount of transmission picture data for each frame for frames FRM11 to FRM26, respectively.

When in frame FRM16, for example, the amount of transmission picture data FD16 of the one frame is inputted and the data residual amount "Buffer" exceeds the upper limit (QNT=31). Therefore, frame dropping is started simultaneously with the completion of the inputting of all the data of the frame FRM16, and thereby the data residual amount "Buffer" is relatively reduced.

As a result, the data residual amount "Buffer" of the transmission buffer memory 32 is reduced below the desired value MG (QNT=1) before transmission picture data FD17 of frame FRM17 is inputted, and hence inputting of the transmission picture data of the frame FRM17 is begun.

In this case the amounts of transmission picture data FD17, FD18, FD19 of each of the subsequent frames FRM17, FRM18 and FRM19 are small and the data residual amount "Buffer" of the transmission buffer memory 32 is below an underflow level UNDER before transmission picture data of frame FRM20 is inputted. In such a case, stuffing bits are inserted between the data before the "Buffer" becomes less than the underflow level UNDER so that the transmission buffer memory 32 does not underflow.

Thus, in the transmission buffer memory 32 frame dropping and stuffing bit inserting techniques are used so that the data residual amount "Buffer" does not either overflow or underflow, and thereby the data residual amount "Buffer" is controlled so as to converge to the desired value (QNT=1) as closely as possible.

According to the construction above, frame dropping is carried out to converge the data residual amount "Buffer" of the transmission buffer memory 32 to the desired value MG (QNT=1), and thus in the reproduction of the output data of the transmission buffer memory 32, video images with visually smooth movement can be obtained and degradation in picture quality can be avoided.

(5) Modifications of the Second Embodiment (5-1) Although in the second embodiment above described, it is stated that the desired value MG (QNT=1) is used as the detection level for the termination of frame dropping operation, the present invention is not so limited. For example, other levels within the quantization size controllable range QCR may be used, depending on the tendency of the amount of transmission picture data generated based on the frequency of swiftly changing video images and slow moving video images.

(5-2) Furthermore, in the above embodiment it is stated that the indication of frame dropping is set in the filter control unit 31 by analyzing the data residual amount "Buffer" of the transmission buffer memory 32, but the present invention is not so limited. The analysis and the setting of the flag may be performed in other data processing units provided as other previous stages to the transmission buffer memory 32.

(5-3) In the above embodiment, there is described the case where the frame dropping is performed by the variable length coding circuit 38, but the present invention is not so restricted. It is, however, preferable that the frame dropping be performed in steps previous to the transmission buffer memory 32. For example, frame dropping may be carried out in the quantizer 37 by detecting the frame dropping indication of the header data.

(5-4) In the embodiment above described, it is stated that the present invention is applied to a picture information transmission system which transmits voice signals and video signals. The present invention is not so limited and may be widely applied to other cases such as a case in which video signals undergo high efficiency coding and then only video signals are transmitted.

(6) The Third Embodiment

(6-1) Construction of the Third Embodiment

Figure 15:
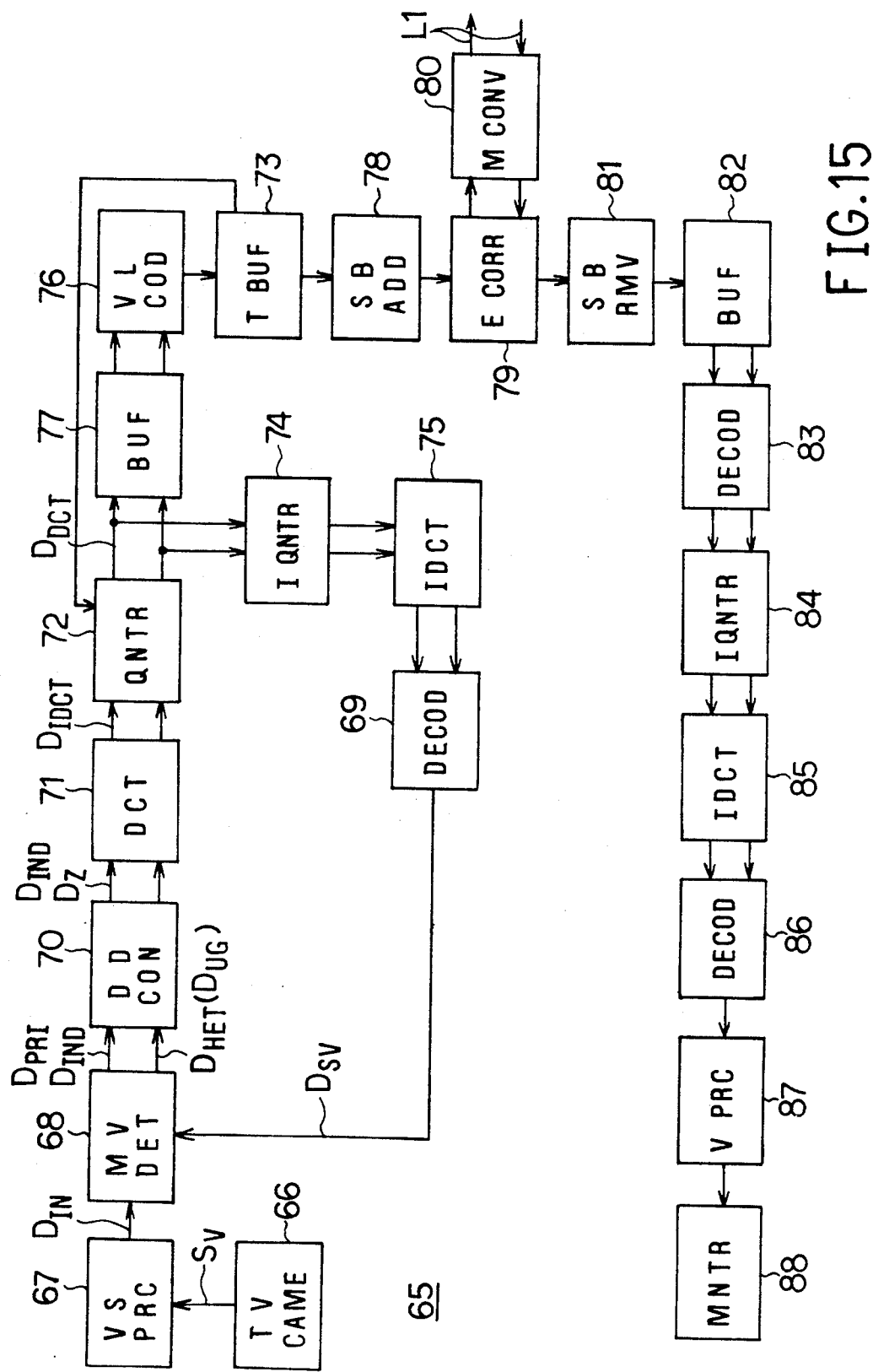
FIG. 15 is a block diagram illustrating the video signal transmission system according to the third embodiment of the present invention.

In FIG. 15, 65 generally designates a videophone system of the third embodiment of present invention, which transmits pictures and voices of communicators to and from a destination.

The video signal transmission system 65 takes a picture of a speaker through a television camera 66, and the video signals $S_v$ outputted from the television camera 66 are provided to a video signal processing circuit 67.

The video signal processing circuit 67 converts the video signals $S_v$ to luminance signals and chrominance signals, which are then converted to digital signals in an analog to digital conversion circuit.

Moreover, the video signal processing circuit 67 converts the luminance signals and the chrominance signals which have been converted to digital signals to signals in a format according to CCITT (International Telegraph and Telephone Consultative Committee).

More specifically, after the frame frequency is converted to 15 Hz by thinning video signals for certain predetermined frames, the number of pixels in vertical and horizontal scanning directions is reduced.

In this manner, with respect to the luminance signals-+input video signals are constructed having consecutive picture data $D_{IN}$ with 352 (horizontal)×288 (vertical) pixels (that is, CIF picture size) or 176×144 pixels (QCIF picture size).

Thus, the amount of data is reduced by applying the preliminary processing to the video signals $S_v$ through the video signal processing circuit 67, and thereby the input video signals having consecutive picture data $D_{IN}$ in line scanning order are obtained.

As shown in FIG. 15, a motion vector detection circuit 68 temporarily stores the picture data $D_{IN}$ in a memory circuit of a scan conversion circuit incorporated therein, and then reorders the array of the picture data $D_{IN}$ by sequentially reading in a predetermined order.

More specifically, the motion vector detection circuit 68 separates one frame of a picture into a 2×6 grid of block groups GOB in horizontal and vertical scanning directions, respectively (FIG. 6).

Furthermore, the motion vector detection circuit 68 separates each block group GOB into an 11×3 grid of macro blocks MB, and then separates each macro block MB into data blocks DB containing 8×8 pixels in the horizontal and vertical scanning directions, respectively (FIG. 6).

Thus, in the video signal processing unit, picture data is transferred and processed in the unit of a block group GOB.

In the array of the picture data $D_{IN}$ within each block group GOB, picture data $D_{IN}$ are consecutively arranged in the unit of a macro block MB; within each macro block MB picture data $D_{IN}$ are consecutively arranged in the unit of a data block DB in the order of the raster scanning.

In each macro block MB, 8×8 pixels of picture block data ($Y_{00}$, $Y_{01}$, $Y_{10}$, and $Y_{11}$) which are consecutive in the horizontal and vertical scanning directions are provided as a unit for the luminance signal whereas in the video signal processing circuit 67 the amount of data for each of the two chrominance signals is reduced and then time-multiplexed and 16×16 pixels of data is allotted to their respective data blocks DB($C_r$, $C_B$).

Next, the motion vector detection circuit 68 detects a motion vector for each macro block MB by setting a picture of the immediately previous frame which has been reconstructed in a decoder circuit 69 as the reference frame.

Furthermore, the motion vector detection circuit 68 moves the picture of the reference frame by the detected motion vectors and constructs picture data of 16×16 pixels at positions corresponding to macro blocks MB of the current frame. Then, the motion vector detection circuit 68 outputs the picture data $D_{PRI}$ to a differential data construction circuit 70.

Simultaneously, the motion vector detection circuit 68 outputs the picture data $D_{IND}$, the array of which has been rearranged, with a delay necessary for detecting motion vectors.

Moreover, the motion vector detection circuit 68 generates a header $D_{HET}$ on the basis of the number of the frame of the picture data $D_{IND}$, address data of the block group and the macro block, motion vector $D_{UG}$, and a sum of an absolute value obtained in detection of the motion vector and outputs the header to the differential data construction circuit 70.

The differential data construction circuit 70 outputs picture data $D_{IND}$ for certain predetermined frames to a subsequent discrete cosine transform circuit 71 without processing it, so that intra coded picture data is transmitted to the transmission destination at predetermined time intervals.

For frames other than intra coded frames, picture data $D_{PRI}$ is subtracted from the picture data $D_{IND}$, and the resultant differential data $D_z$ is outputted to the discrete cosine transform circuit 71.

In the video signal transmission system 65, picture data is thus inter coded by sending differential data $D_z$, and intra coding and inter coding operations are alternated with a predetermined cycle. In this manner, the input video signals are efficiently transmitted to a destination.

In addition, the differential data construction circuit 70 suppresses a high frequency component of the picture data $D_{PRI}$ with a loop filter circuit as needed when the picture data $D_{PRI}$ is subtracted from the picture data $D_{IND}$.

This makes the boundaries between macro blocks MB unobtrusive when differential data $D_z$ is coded by detecting the motion vector in the unit of a macro block MB.

Moreover, the differential data construction circuit 70 detects the amount of data necessary for transmission of a macro block MB. When the differential data construction circuit 70 determines that the macro block MB can be transmitted with a smaller amount of data by intra coding as compared to inter coding, even a macro block MB of a frame to be generally inter coded is outputted to the following discrete cosine transform circuit 71 without performing any operation on the picture data $D_{IND}$, just as in the case of a macro block MB of an intra coded frame.

In the video signal transmission system 65, a high frequency component of motion vector $D_{UG}$ is suppressed based on the amount of data necessary for transmission when inter coding is performed, and the inter coding operation may be switched to the intra coding operation. In this manner, the video signals are efficiently sent using the technique of selective prediction.

Simultaneously, the differential data construction circuit 70 removes data of the absolute sum from the header $D_{HET}$ sent from the motion vector detection circuit 68, and then adds discrimination data of the inter coding and intra coding and discrimination data as to whether or not the differential data is to be obtained through the loop filter circuit for outputting to the discrete cosine transform circuit 71.

The discrete cosine transform circuit 71 performs a discrete cosine transformation on the picture data $D_{IND}$ and the differential data $D_z$, which have been outputted from the differential data construction circuit 70, in the unit of a macro block MB, using a two dimensional autocorrelation between video signals. The resulting transformed data $D_{IDCT}$ is outputted to a quantizer 72.

In addition, the discrete cosine transform circuit 71 adds data, such as the accumulated code length of the transformed data $D_{DCT}$, to the header sent from the differential data construction circuit 70 and then outputs it.

The quantizer 72 quantizes and then outputs the transformed data $D_{DCT}$.

In particular, the quantizer 72 determines the accumulated code length and the amount of the transformed data $D_{IDCT}$ based on the header outputted from the discrete cosine transform circuit 71, and at the same time determines the residual data amount of the transmission buffer circuit 73. According to the result of this determination, the quantization step size is adjusted.

In this manner, the quantizer 72 keeps the amount of data at a predetermined value for each frame to be transmitted.

Furthermore, the quantizer 72 deletes data, such as the accumulated code length of the transformed data $D_{DCT}$, from the header outputted from the discrete cosine transform circuit 71, and then adds data of the quantization step size to the header for outputting.

The inverse quantization circuit 74 performs the inverse transformation to the quantizer 72 according to the header outputted from the quantizer 72, and thereby reconstructs the transformed data $D_{DCT}$ of the differential data construction circuit 70, which is to be reproduced in the transmission destination, at the transmission end.

Next, the inverse discrete cosine transform circuit 75 performs the inverse transformation operation to the discrete cosine transform circuit 71 according to the header sent through the inverse quantization circuit 74.

Thus, in the video signal transmission system 65, the input data of the discrete cosine transform circuit 71 which is reconstructed in the destination is also reproduced in the transmission end.

More specifically, through the inverse discrete cosine transform circuit 75, the picture data $D_{IND}$ can be reconstructed on intra coded video signals and whereas the differential data $D_z$ can be reproduced on inter coded video signals.

A decoder circuit 69 is composed of a frame memory circuit and an adder circuit, and the operation thereof is determined according to the header transmitted through the inverse discrete cosine transform circuit 75.

More specifically, when intra coded data (that is, picture data which reconstructs the picture data $D_{IND}$) is outputted from the inverse discrete cosine transform circuit 75, the decoder circuit 69 directly stores the picture data in the frame memory circuit.

The picture data $D_{SV}$ stored in the frame memory circuit is outputted to the motion vector detection circuit 88 at the time when picture data $D_{IN}$ of the next frame is inputted to the motion vector detection circuit 68.

In this manner, in the motion vector detection circuit 68 a motion vector of the frame subsequent to the intra coded frame can be determined and applied to the intra coded frame as the reference frame.

When inter coded data (that is, data which reconstructs the differential data $D_z$) is outputted from the inverse discrete cosine transform circuit 75, the decoder circuit 69 shifts the picture data $D_{SV}$ stored in the frame memory circuit by the motion vector of the differential data $D_z$, and then adds the shifted picture data to the differential data $D_z$. The resultant data is stored in the frame memory circuit.

Thus, the original picture data of the inter coded frame can be reconstructed. In this manner, pictures sent to the destination are sequentially reconstructed and stored in the frame memory circuit.

Furthermore, the decoder circuit 69 outputs the picture data $D_{SV}$ stored in the frame memory circuit to the motion vector detection circuit 68 at the time when picture data $D_{IN}$ of the next frame is inputted to the motion vector detection circuit 68.

This enables motion vectors of current frames to be sequentially determined on the basis of respective immediately previous frames in the motion vector detection circuit 68.

In addition, in the decoder circuit 69, high frequency component of differential data $D_z$ which has been produced through the loop filter circuit is suppressed by means of the loop filter circuit and the differential data $D_z$ is shifted by the motion vector. Thus, the loop filter circuit of the decoder circuit 69 is modified in relation to the loop filter circuit of the differential data construction circuit 70 so that the effect of the former is reversed to the letter.

A variable length coding circuit 76 applies variable length processing to the output data of the quantizer 72 together with data such as the motion vector, the output data being obtained through the buffer circuit 77. Then, the variable length coding circuit 76 outputs the resultant data to the transmission buffer circuit 73 together with the header.

The transmission buffer circuit 73 temporarily stores and then sequentially outputs the output data of the variable length coding circuit 76.

A stuff bit adding circuit 78 outputs the output data of the transmission buffer circuit 73 to an error correction circuit 79. In particular, the stuff bit adding circuit 78 detects the amount of input and output data of the transmission buffer circuit 73. When the amount of input data of the transmission buffer circuit 73 becomes extremely small as compared to the transmission rate of the line L1, the stuff bit adding circuit 78 inserts stuff bits in the data at predetermined times.

The error correction circuit 79 generates a BCH code (bose chaudhuri hocquenghem code) based on the output data of the stuff bit adding circuit 78. The error correction circuit 79 adds the BCH code to the output data from the stuff bit adding circuit 78 and outputs the resulting data.

Furthermore, the error correction circuit 79 performs error correction on data obtained from the destination through a multiplex conversion circuit 80 according to the BCH code transmitted by the distinction, and thereby degradation in picture quality is effectively avoided if an error or errors occur during transmission.

The multiplex conversion circuit 8 multiplexes digital voice signals with the output data of the error correction circuit 79 and then outputs the resulting signals to the line L1.

This enables video signals $S_V$ and voice signals to be efficiently sent to the transmission destination.

Simultaneously, the multiplex conversion circuit 80 inputs data transmitted from the destination through the line L1, and separates multiplexed video and digital voice signals.

Furthermore, the multiplex conversion circuit 80 outputs separated digital voice signals to a decoding circuit, and outputs the video signals to a stuff bit removing circuit 81.

The stuff bit removing circuit 81 removes the stuff bits which have been inserted by the stuff bit adding circuit 78 at the destination.

A buffer circuit 82 temporarily stores the stuff bits removed data, and then outputs it to a decoding circuit 83 after the header is separated.

The decoding circuit 83 performs a processing inverse to the processing of the variable length coding circuit 76 at the destination.

An inverse quantization circuit 84 performs inverse quantization on the output data of the decoding circuit 83 according to the header inputted through the decoding circuit 83, and thereby reconstructs the input data to the quantizer 72 at the destination.

Simlarly to the inverse discrete cosine transform circuit 75, an inverse discrete cosine transform circuit 85 processes the output data of the inverse quantization circuit 84 according to the header, and thereby reconstrcuts the input data to the discrete cosine transform circuit 71 at the destination.

A decoder circuit 86 performs an operation similar to the operation of the decoder circuit 69 according to the header transmitted, and thus picture data encoded at the destination is reconstructed.

A video signal processing circuit 87 executes the operation inverse to the operation of the video signal processing circuit 67 by a technique of interpolation, and then outputs the resulting video signals to a monitor 88, so that the picture to be communicated which has been sent from the destination can be monitored.

(6-2) Differential Data Producing Circuit

Figure 16:
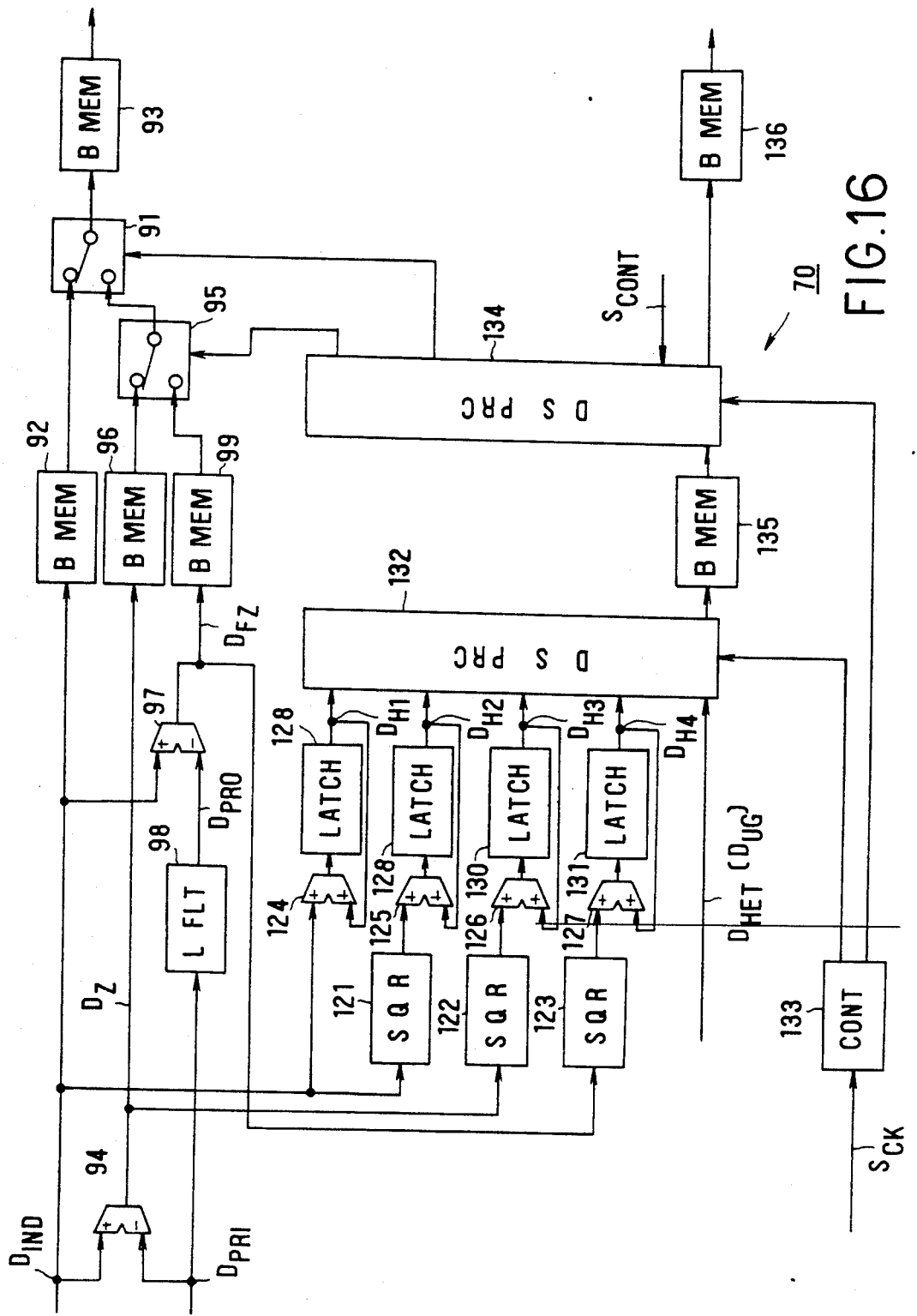
FIG. 16 is a block diagram showing the differential data producing circuit.

As shown in FIG. 16, the differential data construction circuit 70 inputs picture data DIND outputted from the motion vector detection circuit 68, to a switch circuit 91 through a buffer memory circuit 92.

Thus, the differential data construction circuit 70 outputs picture data $D_{IND}$ to the subsequent discrete cosine transform circuit 71 through the switch circuit 91 and the buffer memory circuit 93 when intra coded video signals are sent.

An arithmetic and logic circuit 94 of a subtraction circuit configuration subtracts picture data DPRI from picture data $D_{IND}$ to produce differential data $D_z$, which is outputted to a switch circuit 95 through a buffer memory circuit 96.

Thus, the differential data construction circuit 70 outputs differential data $D_Z$ to the subsequent discrete cosine transform circuit 71 by switching contacts of the switch circuits 91 and 95 when inter coded video signals are transmitting.

An arithmetic and logic circuit 97 of a subtraction circuit configuration accepts picture data $D_{PRI}$ through a loop filter circuit 98 to subtract the picture data $D_{PRI}$ from the picture data $D_{IND}$ to produce differential data $D_{FZ}$.

Furthermore, the arithmetic and logic circuit 97 outputs the differential data $D_{FZ}$ to the switch circuit 95 through the buffer memory circuit 99, and the contact of the switch circuit 95 is switched so that the differential data $D_{FZ}$ may be outputted to the discrete cosine transform circuit 71 in place of the differential data $D_Z$.

Figure 17:
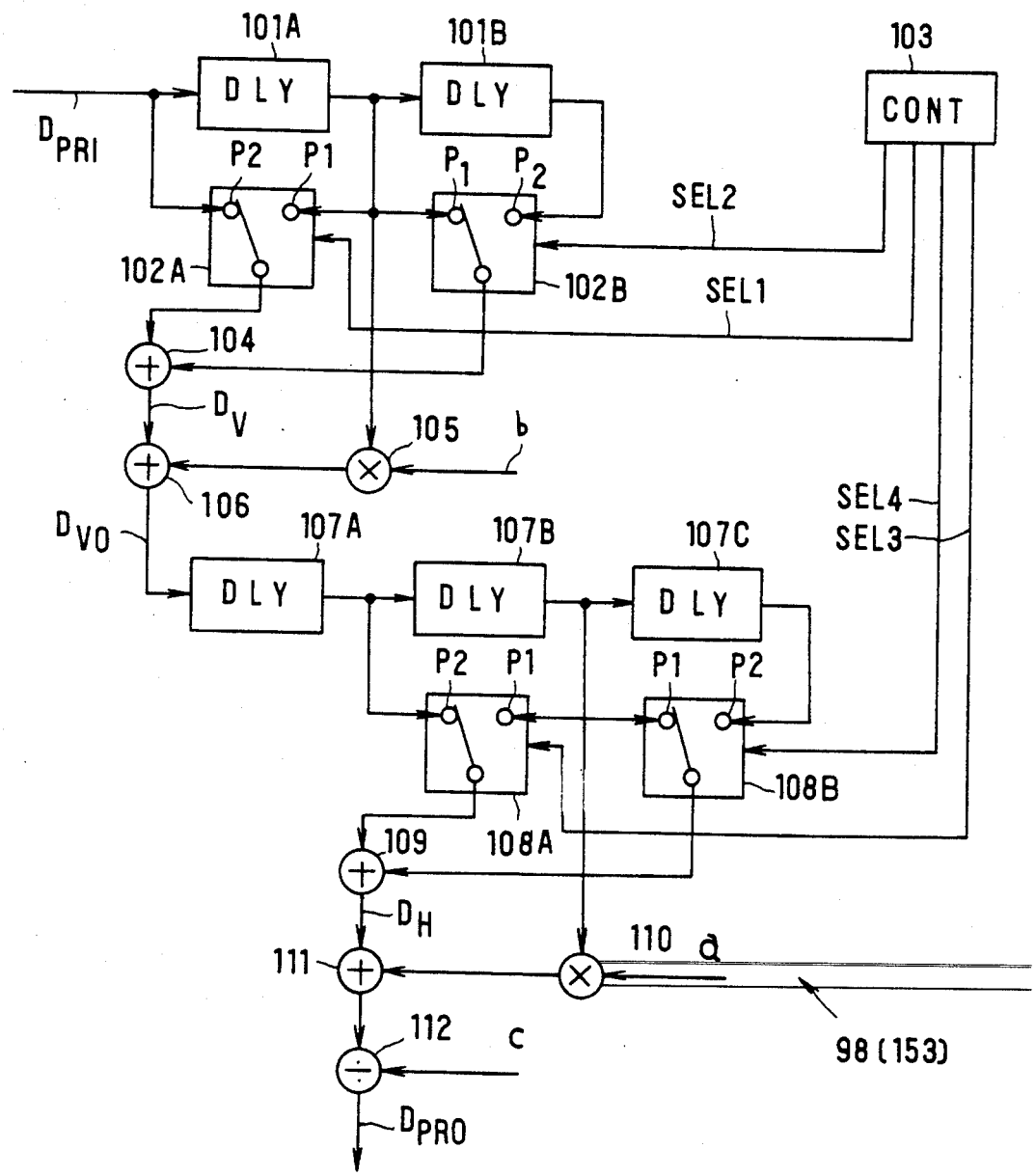
FIG. 17 is a block diagram illustrating the loop filter circuit.

As shown in FIG. 17, the loop filter circuit 98 has delay circuits 101A and 101B connected in series and provides picture data $D_{PRI}$ to the delay circuit 101A.

Figure 18:
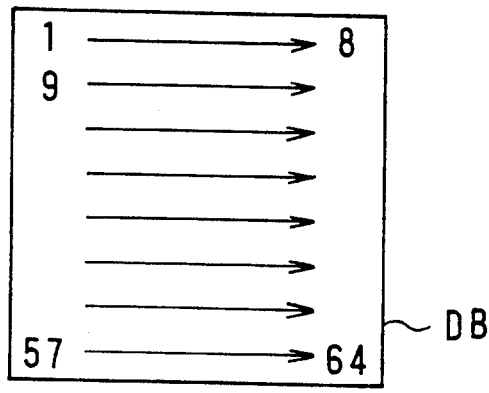

As illustrated in FIG. 18, the delay circuits 101A and 101B are each built by connecting eight stages of flip-flop circuits which operate according to the clock frequency of the picture data $D_{PRI}$. Thus, picture data DPRI which is sequentially inputted at the timing of the raster scanning is delayed in the unit of each data block for the time interval of one horizontal scan of the data block.

Accordingly, in input data DPRI of the delay circuit 101A and the output data of the delay circuit 101B, picture data $D_{PRI}$ (hereinafter referred to as picture data of the next line and the previous line, respectively) of pixels which are adjacent to the output data of the delay circuit 101A (hereinafter referred to as picture data of the current line) in the vertical scanning direction and in a direction reverse to the vertical scanning direction are sequentially arranged.

In a selection circuit 102A, picture data $D_{PRI}$ of the current lines and the next line are inputted to contacts P1 and P2 whereas in a selection circuit 102B picture data $D_{PRI}$ of the current line and the previous line are outputted to contacts P1 and P2.

Furthermore, the selection circuits 102A and 102B switch their contacts according to switch signals SEL1 and SEL2 outputted from a control circuit 103, and the selected outputs thereof are added in an adder 104.

Figure 19:
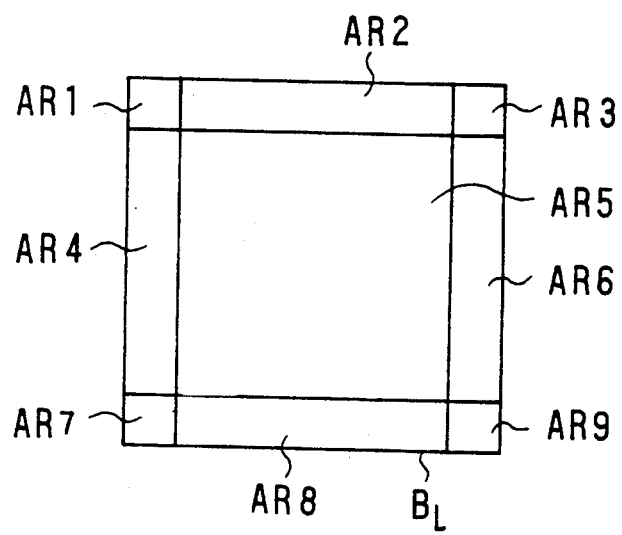

More specifically, as shown in FIGS. 19 and 20, the selection circuits 102A and 102B select contacts P1 during the time interval in which the picture data $D_{PRI}$ of the first line AR1, AR2 and AR3 and the last line AR7, AR8 and AR9 of a data block DB is outputted from the delay circuit 101A.

Thus, doubly weighted picture data $D_{PRI}$ (designated by $A_{0,0}$) of the current line can be obtained through the adder 104 during these time intervals.

On the other hand, the selection circuits 102A and 102B select contacts P2 while picture data $D_{PRI}$ of the remaining regions AR4, AR5 and AR6 are outputted from the delay circuit 101A.

In this manner, addition data $(A_{o,-1}+A_{o,1})$ of picture data $D_{PRI}$ (designated by $A_{0,-1}$, $A_{o,1}$, respectively) of the next line and the previous line can be obtained through the adder 104 during these time intervals.

A multiplier 105 doubles picture data $D_{PRI}$ of the current line, and then adds the resulting data to output data $D_y$ of the adder 104 at adder 106.

Thus, in output data $D_{vo}$ of the adder 106, quadruply weighted picture data $4A_{o,o}$ is obtained during the time interval in which the picture data $D_{PRI}$ of the regions AR1, AR2, AR3, AR7, AR8 and AR9 is outputted from the delay circuit 101A.

On the other hand, addition data $(A_{0,-1}+2A_{0,0}+A_{0,1})$ obtained by adding the doubly weighted picture data $A_{0,0}$ of the current line to the addition data $(A_{0,-1}+A_{0,1})$ is obtained during the time intervals in which the picture data $D_{PRI}$ of the remaining regions AR4, AR5 and AR6 are outputted from the delay circuit 101A.

Delay circuits 107A, 107B and 107C consist of flip-flop circuits actuated by the clock frequency of the picture data $D_{PRI}$, respectively, and are connected in series, with output data $D_{vo}$ of the adder 106 inputted to one end thereof.

Accordingly, picture data $D_{PRI}$ of pixels (hereinafter referred to as picture data of the next pixel and the previous pixel and designated by $A_{1,-1}$, $A_{0,-1}$, $A_{-1,-1}$ and $A_{1,1}$, $A_{0,1}$, $A_{-1,1}$, respectively) which are adjacent to output data $D_{PRI}$ of the delay circuit 107B (hereinafter referred to as picture data of the current pixel and designated as $A_{1,0}$, $A_{0,0}$, and $A_{-1,0}$ among picture data of the previous line, the current line and the next line, respectively) in the horizontal scanning direction and in a direction reverse to the horizontal scanning direction is obtained through the delay circuit 107A and the delay circuit 107C.

In a selection circuit 108A the picture data $D_{PRI}$ of the current pixel and the next pixel are inputted to contacts P1 and P2 while a selection circuit 108B inputs the picture data $D_{PRI}$ of the current pixel and the previous pixel.

Furthermore, the selection circuits 108A and 108B switch their contacts according to switch signals SEL3 and SEL4 outputted from the control circuit 103, and add their selection outputs at an adder 109.

More specifically, the selection circuits 108A and 108B select contacts P1 during the time intervals in which picture data $D_{PRI}$ of the data block DB at the horizontal scanning start positions AR1, AR4 and AR7 and the horizontal scanning end positions AR3, AR6 and AR9 are outputted from the delay circuit 107B.

Thus, eight-fold weighted picture data $8A_{0,0}$ of the current pixel is obtained during the time interval of outputting picture data $D_{PRI}$ of the regions AR1, AR3, AR7 and AR9.

On the other hand, addition data $(2A_{0,-1} + 4A_{0,0} + 2A_{0,1})$ doubly weighting the output data $D_{vo}$ of the adder 106 is obtained during the time intervals of outputting picture data $D_{PRI}$ of the regions AR4 and AR6 as picture data of the current pixel.

During the time intervals in which picture data $D_{PRI}$ of the remaining regions AR2, AR5 and AR8 is outputted as picture data $D_{PRI}$ of the current pixel, the selection circuits 108A and selection circuit 108B select contacts P2.

Thus, quadruply weighted addition data $(4A_{-1,0} + 4A_{1,0})$ of picture data $A_{-1,0}$ and $A_{1,0}$ of the next and previous pixel is obtained through the adder 109 during the time intervals of outputting picture data $D_{PRI}$ of the regions AR2 and AR8 as picture data of the current pixel.

On the other hand, addition data $(A_{-1,-1} + 2A_{-1,0} + A_{-1,1} + A_{1,-1} + 2A_{1,0} + A_{1,1})$ which adds weighted picture data surrounding the current pixel is obtained through the adder 109 during the time interval of outputting picture data $D_{PRI}$ of the region AR5 as picture data of the current pixel.

A multiplier 110 doubles the picture data $A_{0,0}$ of the current pixel, and then adds the resulting data to output data $D_H$ of the adder 109 at a n adder 111.

A divider 112 divides output data $D_{HO}$ of the adder 111 by 16, and outputs the resulting data $D_{PRO}$ to the arithmetic and logic circuit 97 (FIG. 16).

Thus, during the time periods in which the picture data $D_{PRI}$ of the regions AR1, AR3, AR7 and AR9 of the four corners of the data block DB are outputted as picture data of the current pixel, picture data $16A_{0,0}$ of the current pixel which has been weighted 16 times through the adder 111 is obtained (FIG. 17), and is then divided by the divider 112 to output the picture data $A_{0,0}$ of the current pixel.

When each picture data $A_{1,1}$ to $A_{-1,-1}$ is arranged to correspond to FIG. 19 as shown in FIGS. 21 and 22, a $3 \times 3$ grid of output data from the two dimensional filter circuit in which only $A_{0,0}$ can be weighted with a value of 1 is obtained.

During the time intervals in which the picture data $D_{PRI}$ of the regions AR2 and AR8 are outputted as picture data of the current pixel, addition data $(4A_{-1,0} + 8A_{0,0} + 4A_{1,0})$ is obtained by weight adding picture data $A_{-1,0}$, $A_{0,0}$ and $A_{1,0}$ of the next, the current and the previous pixels, and is thus divided by the divider 112 to produce picture data $(A_{-1,0} + 2A_{0,0} + A_{1,0})/4$.

Thus, normalized $3 \times 3$ output data of the two dimensional filter circuit can be obtained by weight adding picture data of three horizontally consecutive pixels with value 1, 2 and 1.

During the time intervals in which the picture data $D_{PRI}$ of the regions AR4 and AR6 are outputted as the picture data of the current pixel, addition data $(4A_{0,-1} + 8A_{0,0} + 4A_{0,1})$ having the picture data $A_{0,-1} + A_{0,0} + A_{0,1}$ of the next, the current and the previous line weight added is obtained, and is thus divided by the divider 112 to produce picture data $(A_{0,1} + 2A_{0,0} + A_{0,-1})/4$.

Thus, normalized $3 \times 3$ output data of the two dimensional filter circuit can be obtained by weight adding picture data of three vertically consecutive pixels with values 1, 2 and 1.

During the time intervals in which the picture data $D_{PRI}$ of the region AR5 is outputted as the picture data of the current pixel, addition data $(A_{-1,-1} + 2A_{-1,0} + A_{-1,1} + 2A_{0,-1} + 4A_{0,0} + 2A_{0,1} + A_{1,-1} + 2A_{1,0} + A_{1,1})$ having the picture data $A_{-1,-1}$ to $A_{1,1}$ weight added is obtained, and is thus divided by the divider 112 to produce picture data $(A_{-1,-1} + 2A_{-1,0} + A_{-1,1} + 2A_{0,-1} + 4A_{0,0} + 2A_{0,1} + A_{1,-1} + 2A_{1,0} + A_{1,1})/16$.

Thus, normalized $3 \times 3$ output date of the two dimensional filter circuit ca be obtained by sequentially weight adding picture data of nine vertically and horizontally consecutive pixels.

More generally, a filter circuit with a characteristic defined by the following equation can be obtained by switching contacts of the selection circuits 102A, 102B, 108A and 108B $$F = \frac{1}{(a+2)(b+2)} \quad (6)$$

$$\begin{vmatrix} 1 & a & 1 \\ b & ab & b \\ 1 & a & 1 \end{vmatrix}$$

where multipliers of the multipliers 105 and 110 are a and b, and the divisor c of the divider 96 is expressed as $(a+2)(b+2)$.

The characteristics of the loop filter circuit 98 can be changed by switching contacts of the selection circuits 102A, 102B, 108A and 108B depending on the position of the picture data $D_{PRI}$ within the data block.

Thus, there is no need to use several kinds of filter circuits, and boundaries between data blocks can be made unobtrusive with a simple circuit construction.

In this embodiment, the vertical digital filter circuit which outputs picture data consecutive in the vertical scanning direction from each of the delay circuits 101A and 101B is built by connecting the delay circuits 101A and 101B in series whereas the selection circuits 102A and 102B and the adder 104 constitute a vertical selection circuit which selectively outputs picture data outputted from the vertical digital filter circuit.

In addition, the horizontal digital filter circuit which outputs picture data consecutive in the horizontal scanning direction from each of the delay circuits 107A, 107B and 107C is built by connecting the delay circuits 107A, 107B and 107C in series whereas the selection circuits 108A and 108B and the adder 109 constitute a horizontal selection circuit which selectively outputs picture data outputted from the horizontal digital filter circuit.

Furthermore, picture data $D_{PRO}$ can be outputted in the order to inputted picture data by building the loop filter circuit 98 in this manner, and thereby the construction of the input/output circuit of the loop filter circuit 98 can be simplified.

Returning to FIG. 16, square circuits 121, 122 and 123 output squares of picture data $D_{IND}$, differential data $D_Z$ and differential data $D_{FZ}$, respectively.

Arithmetic logic units 124, 125, 126 and 127 add picture data $D_{IND}$ and the output data of the square circuits 121, 122 and 123 to output data of latch circuits 128, 129, 130 and 131, respectively, and output the results of the summing back to latch circuits 128, 129, 130 and 131.

Thus, the arithmetic logic circuits 124, 125, 126 and 127 compute evaluation data DH1, DH2, DH3 and DH4, defined by the following equations, for each macro block:

$$D_{H1} = \Sigma\ (A) \quad (7)$$

$$D_{H2} = \Sigma\ (A)^2 \quad (8)$$

$$D_{H3} = \Sigma\ (A-B)^2 \quad (9)$$

$$D_{H4} = \Sigma\ (A-FB)^2 \quad (10)$$

where A and B represent picture data $D_{IND}$ and picture data $D_{PRI}$ and FB represents the output data $D_{PRO}$ of the loop filter circuit 98. The evaluation data $D_{H1}$, $D_{H2}$, $D_{H3}$ and $D_{H4}$ are outputted to a digital signal processing circuit 132.

The digital signal processing circuit 132 is constituted by an operation processing circuit, and is actuated based on reference signals outputted from a control circuit 133 synchronously with a system clock signal $S_{CK}$. Furthermore, the digital signal processing circuit 132 adds evaluation data $D_{H1}$, $D_{H2}$, $D_{H3}$ and $D_{H4}$ to header $D_{HET}$ outputted from the motion vector detection circuit 68, and outputs the resulting header data to a digital signal processing circuit 134 through a buffer memory circuit 135.

The digital signal processing circuit 134 is comprised of an operation processing circuit similar to that of the digital signal processing circuit 132, and controls the switch circuit 91 and the switch circuit 95 according to the header $D_{HET}$.

More specifically, picture data $D_{IND}$ is outputted to the subsequent discrete cosine transform circuit 71 for certain predetermined frames according to the frame number specified in the header $D_{HET}$.

Thus, in the video signal transmission system video signals can be transmitted by intra coding certain predetermined frames.

On the other hand, differential data $D_{FZ}$ is outputted to the discrete cosine transform circuit 71 for the remaining frames, and intercoded video signals are thus transmitted.

In this case, the digital signal processing circuit 134 performs a comparison between the evaluation data $D_{H2}$, $D_{H3}$ and $D_{H4}$ and outputs picture data $D_{IND}$ to the discrete cosine transform circuit 71 in place of differential data $D_Z$ or $D_{FZ}$ when the evaluation data $D_{H2}$ is smaller than evaluation data $D_{H3}$ and $D_{H4}$.

More specifically, when the evaluation data $D_{H2}$ is smaller than evaluation data $D_{H3}$ and $D_{H4}$ according to the equations (8) to (10), picture data can be more efficiently sent by transmitting picture data $D_{IND}$ in place of differential data $D_Z$ or $D_{FZ}$.

Moreover, the digital signal processing circuit 134 outputs differential data $D_Z$ to the discrete cosine transform circuit 71 in place of differential data $D_{FZ}$ (or picture data $D_{IND}$) when the evaluation data $D_{H3}$ is smaller than evaluation data $D_{H2}$ and $D_{H4}$.

That is, there is a case where boundaries between data blocks are unobtrusive even if unfiltered differential data $D_z$ is coded, and there is another case where more efficient transmission is performed by coding differential data $D_z$ rather than differential data $D_{FZ}$.

Thus, as in this embodiment, video signals can be transmitted efficiently as a whole by switching the coding operation according to evaluation data $D_{H1}$, $D_{H2}$, $D_{H3}$ and $D_{H4}$.

Furthermore, the digital signal processing circuit 134 removes evaluation data $D_{H1}$, $D_{H2}$, $D_{H3}$ and $D_{H4}$ from the header $D_{HET}$ outputted from the digital signal processing circuit 132, and then adds the information as to the settings of the switch circuits 91 and 95 to the header $D_{HET}$. The modified header $D_{HET}$ is then outputted through the buffer memory circuit 136 to the discrete cosine transform circuit 71.

(6-3) Decoder Circuit

Figure 23:
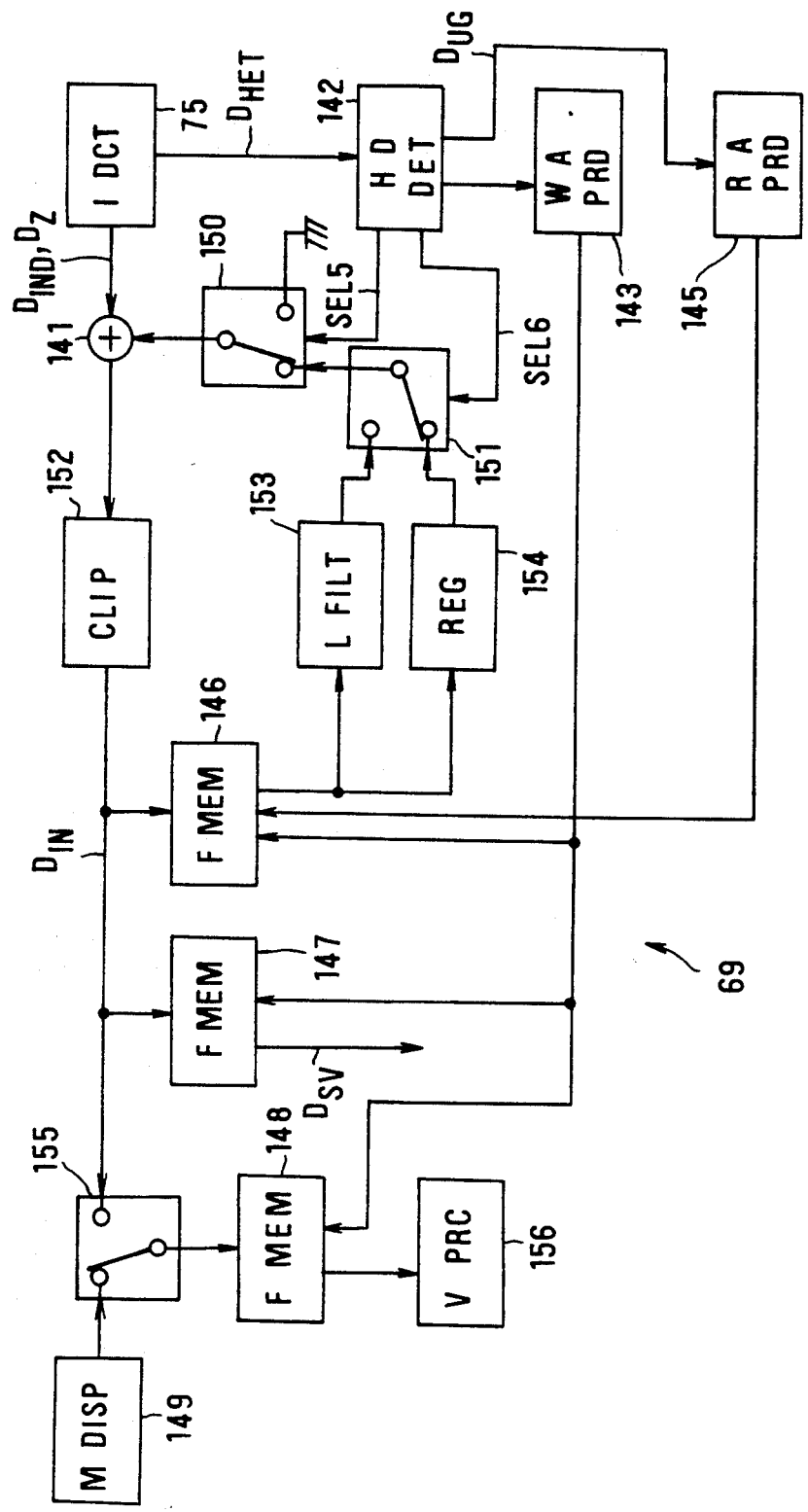
FIGS. 23 and 24 are block diagrams illustrating decoder circuits.

As shown in FIG. 23, the decoder circuit 69 provides the picture data $D_{INV}$ and $D_z$ and the header $D_{HET}$ outputted from the inverse discrete cosine transform circuit 75 to an adder 141 and a header detection circuit 142.

The header detection circuit 142 separates the frame number, address data of a block group, macro block and data blocks, and the motion vector from the header $D_{HET}$ for outputting to address data producing circuits 143 and 145.

The address data producing circuits 143 and 145 generate address data for writing to frame memory circuits 146, 147 and 148, and for reading the frame memory circuit 146 to the motion vector, respectively.

The header detection circuit 142 outputs identification data for inter coding and intra coding to a mode indication circuit 149 as well as switch signals SEL5 and SEL6 according to the identification data for inter coding and intra coding and according to the on-off information of the loop filter circuit.

Thus, the header detection circuit 142 switches contacts of the selection circuits 150 and 151, and switches the operation of the decoder circuit 69 in accordance with picture data $D_{INV}$ and $D_z$ reconstructed in the inverse discrete cosine transform circuit 75.

More specifically, in the case where intra coded picture data $D_{INV}$ is processed, the header detection circuit 142 selects the earth contact of the selection circuit 150.

Thus, the picture data $D_{INV}$ reconstructed in the inverse discrete cosine transform circuit 75 is outputted through the adder 141 and a clipping circuit 152, and is stored in the frame memory circuits 146, 147 and 148 according to the address data outputted from the write address data producing circuit 143.

In the case where inter coded differential data $D_z$ is processed, the header detection circuit 142 selects the selection circuit 151 side contact of the selection circuit 150.

This enables picture data outputted from the frame memory circuit 146 through either a loop filter circuit 153 or a register circuit 154 but shifted in time by the motion vector, to be supplied to adder 141.

Thus, the differential data $D_z$ reconstructed in the inverse discrete cosine transform circuit 75 is added to the picture data shifted by the motion vector and read from the frame memory circuit 146 at the adder 141, and is then stored in the frame memory circuits 146, 147 and 148 to thereby reconstruct the original picture data.

In the case where the loop filter circuit 98 is selected in the differential data producing circuit 70 (FIG. 16), the selection circuit 151 is controlled so that the loop filter circuit 135 side contact is selected in reconstructing the corresponding picture data, and thereby the original picture data is reconstructed with reference to the picture data of the previous frame for which the high frequency band has been suppressed as it was when the differential data $D_z$ was produced.

Thus, differential data $D_{FZ}$ which has been constructed through the loop filter circuit 98 can be reconstructed through the loop filter circuit 153, and thereby boundaries between macro blocks can be made unobtrusive.

The loop filter circuit 153 is constituted by a two dimensional filter circuit of the same configuration as the loop filter circuit 98 (FIG. 17), and this enables characteristics of several kinds to be selected by merely switching contacts of the selection circuits. Thus, the construction of the decoder circuit 69 is simplified.

The frame memory circuit 147 temporarily stores reconstructed picture data by sequentially storing the picture data obtained through the adder 141, and then outputs picture data $D_{SV}$ for a single block gap at a time to the motion vector detection circuit 68 according to the address data outputted fro the motion vector detection circuit 68.

This enables the motion vector detection circuit 68 to sequentially determine appropriate motion vectors according to the reconstructed picture data $D_{SV}$.

The frame memory circuit 148 selectively accepts picture data, obtained through the adder 141, and output data from the mode indication circuit 149 through the selection circuit 155, and outputs this data to a display 156.

The mode indication circuit 149 outputs picture data of different chrominance signals depending on whether intra coding and inter coding operations ar being performed.

The selection circuit 155 outputs data relating to the chrominance signals outputted from the mode indication circuit 149 to frame memory circuit 148 as well as data relating to the luminance signals of the picture data, outputted from the adder 141, from the frame memory circuit 148 based on the operation of an actuator (not shown).

This enables the display 156 to display pictures of differing color characteristics depending on whether intra coding on inter coding operations are being performed.

Thus, at the end of the transmitter maintenance workers can confirm by visual observation the pictures to be reconstructed at the destination. This enables the operation of the video signal transmission system 65 to be verified. In particular, it is possible to confirm based on differences in display colors whether intra coding or inter coding is being performed.

Figure 24:
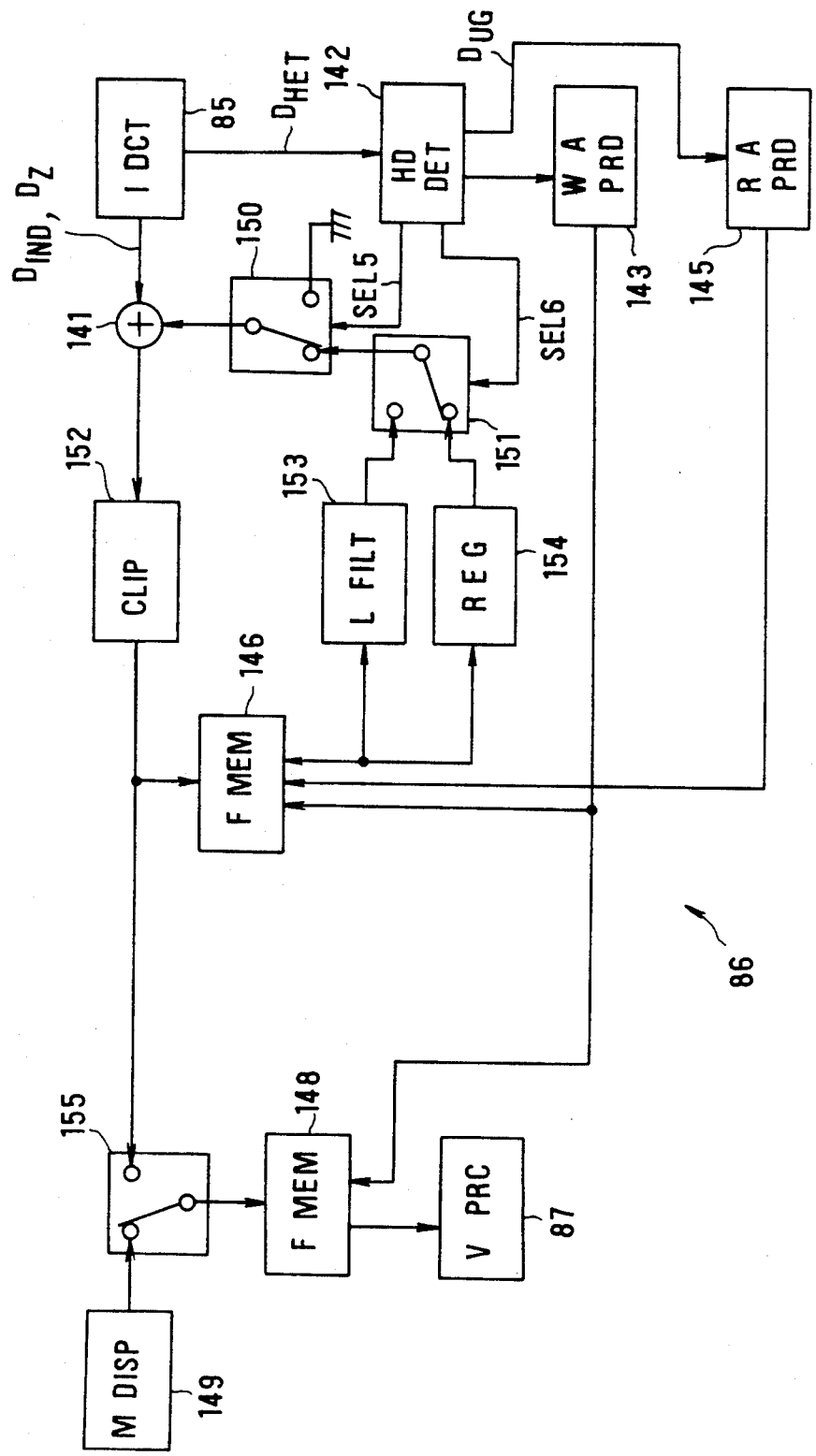

As shown in FIG. 24, in which each of corresponding parts of FIG. 23 are designated by the same reference numeral, in a decoder circuit 86 the frame memory circuit 147 is omitted and the output data of the frame memory circuit 148 is outputted to the video signal processing circuit 87.

This enables pictures sent from the destination to be monitored by the monitor 88 (FIG. 15), and further it is possible to determine, by controlling an actuator (not shown) which, in turn, controls the selection circuit 155, whether an intra coding or an inter coding operation is being performed at the destination.

Thus, in the decoder circuit 86 the overall construction can also be simplified by using a loop filter circuit 153 of the same configuration as in the differential data producing circuit 70.

In the case where loop filter circuits are used in this type of video signal transmission system, three loop filter circuits with the same characteristics are needed, and hence when individual loop filter circuits are complicated, the video signal transmission system as a whole becomes excessively large.

However, if as in this embodiment, a loop filter circuit which is capable of selecting several kinds of behavior by switching contacts of the selection circuits issued, the video signal transmission system 65 (FIG. 15) as a whole can be simplified with ease.

(6-4) Operation of the Third Embodiment

In the above construction, video signals $S_V$ outputted from the television camera 66 (FIG. 15) undergo the preliminary processing in the video signal processing circuit 67 to reduce the amount of data and are converted to picture data $D_{IN}$ in the CCITT format.

A motion vector for picture data $D_{IN}$ is determined for every macro block after the array of the picture data is rearranged in the motion vector detection circuit 16.

Here, picture data $D_{PRI}$ for comparison reference is produced according to the detected motion vector, and the picture data $D_{PRI}$ is outputted to the differential data construction circuit 70 together with the picture data $D_{IND}$ (FIG. 16).

In the differential data producing circuit 70, differential data $D_z$ is produced by directly subtracting the picture data $D_{PRI}$ from the picture data $D_{IND}$.

Simultaneously, in the loop filter circuit 98 (FIG. 17) the picture data $D_{PRI}$ is fed to the delay circuits 101A and 101B, and thereby picture data of the previous, current and next lines are produced.

The picture data of the previous, current and next lines are selectively outputted through the selection circuits 102A and 102B according to which line of the macro block the current line is, and then added in the adder 104, after which the resulting data is added to the weighted picture data of the current line in the adder 106.

This provides picture data $D_{vo}$ in the vertical scanning direction with frequency characteristics according to the output selection of the selection circuits 102A and 102B.

The picture data $D_{vo}$ is fed to the delay circuits 107A, 107B and 107C, where picture data of previous, current and next pixels are constructed. The picture data of the previous, current and next pixels are selectively outputted through the selection circuit 108A and 108B according to which pixel of the current line the current pixel is, to undergo addition in the adder 109, and are then added to weighted picture data of the current pixel at the adder 111.

This enables picture data $D_{PRO}$ to be provided in the horizontal scanning direction with frequency characteristics depending on the output selection of the selection circuits 108A and 108B.

The picture data $D_{PRO}$ of the loop filter circuit 98 is subtracted from the picture data $D_{IND}$ to produce differential data $D_{FZ}$.

The evaluation data $D_{H1}$, $D_{H2}$, $D_{H3}$ and $D_{H4}$ of equations (7) to (10) are computed from the picture data $D_{IND}$, and the differential data $D_z$ and $D_{FZ}$ in the arithmetic logic units 124 to 127, and the picture data $D_{IND}$ and the differential data $D_z$ and $D_{FZ}$ are selectively outputted to the subsequent discrete cosine transform circuit 71 (FIG. 15). according to a comparison of the evaluation data $D_{H1}$, $D_{H2}$, $D_{H3}$ and $D_{H4}$.

In this manner, in the inter coded frames differential data $D_z$ and $D_{FZ}$ are outputted to the discrete cosine transform circuit 71 whereas in intra coded frames picture data $D_{IND}$ is directly outputted to the discrete cosine transform circuit 71.

The transformed data $D_{DCT}$ which has been obtained through the discrete cosine transform circuit 71 is quantized in the quantizer 72, and then undergoes variable length coding processing in the variable length coding circuit 76 through the buffer circuit 77. The output data is sequentially sent to the destination through the transmission buffer circuit 73, the stuff bit adding circuit 78, the error correction circuit 79 and the multiplex conversion circuit 80.

The output data of the quantizer 72 is decoded in the decoder circuit 69 to picture data through the inverse quantization circuit 74 and the inverse discrete cosine transform circuit 75, and the picture data is outputted as picture data $D_{SV}$ of the previous frame for determining the motion vector.

When the differential data $D_{FZ}$ which is produced through the loop filter circuit 98 is processed in this manner, picture data of the previous frame outputted from the frame memory circuit 146 (FIG. 24) is added to differential data $D_{FZ}$ through the loop filter circuit 153, and thereby boundaries between data blocks are made less obtrusive.

(6-5) Effects of the Embodiment

According to the foregoing construction, it is possible picture data of previous, current and next lines are selectively outputted, and the selective output is switched to thereby modify the characteristics of the loop filter circuit with a simple construction.

(7) Modifications of the Third Embodiment (7-1) In the embodiment above described, it is stated that the characteristic of the loop filter circuit is switched as shown in FIG. 22. However, the present invention is not so limited. If the contacts P1 and P2 are selected as shown in FIG. 25, for example, a filter characteristic as shown in FIG. 26 is obtained, and hence the present invention is widely applicable to obtain various characteristics as needed.

(7-2) Moreover, in the above embodiment, the case where weighted picture date of the current line and the current pixel are added to the addition data of the adders 104 and 109 is described but the present invention is no so limited. The addition operation may be omitted if desired.

(7-3) Furthermore, in the above embodiment, the data is first processed in the vertical scanning direction, and the resultant data is then processed in the horizontal scanning direction, but the present invention is not so restricted. Alternatively, the picture data $D_{PRI}$ may be inputted to the delay circuit 107A, the output data of the adder 111 may be outputted to the delay circuit 101A, and the output data of the adder 106 may be divided by the divider 112.

(7-4) In the foregoing embodiment, it is stated that the present invention is applied to a video signal transmission system for transmitting video signals together with voice signals but the present invention is not so limited. The present invention may be widely applied in cases such as the case of transmitting high efficiency coded video signals alone and to the case of saving video signals on a recording media. The present invention may be further applied to a two dimensional filter circuit to correct the frequency characteristics of picture data.

(8) The Fourth Embodiment

(8-1) Construction of the Fourth Embodiment

Figure 27:
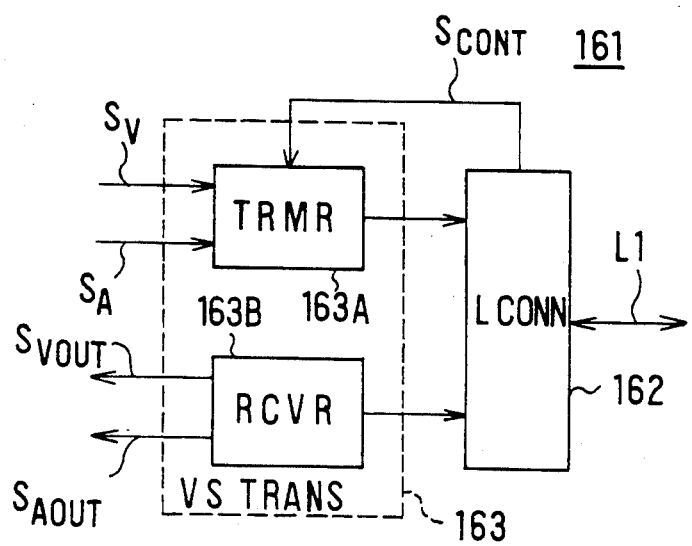
FIG. 27 is a block diagram illustrating the videophone system in accordance with the fourth embodiment of the present invention.

In FIG. 27, 161 generally designates a picture phone system, which outputs video signal $S_V$ and voice signal $S_A$ to a destination through the line L1.

In addition, the picture phone 161 demodulates data transmitted from the destination through the line L1 to output video signal $S_{VOUT}$ and voice output signal $S_{A-OUT}$.

For this purpose, the line connecting unit 162 performs a line connecting operation to interconnect between the destination and the line L1.

More specifically, when the line L1 is connected to a predetermined destination after a calling signal is outputted to the line L1, the line connecting unit 162 detects an answer signal, so that the logic level of the control signals $S_{CONT}$ rises.

Moreover, the line connecting unit 162 cuts off the line L1 by outputting an on-hook signal after the conversation is completed.

Meanwhile, a video signal transmission system 163 performs a coding operation of the video signal $S_V$ by converting the video signals $S_V$ to digital signals in a transmitter 163A, and then outputs the signals by multiplexing them with digital voice signals. In this manner, pictures and voices of the speaker are outputted to the destination through the line connecting unit 162.

Figure 28:
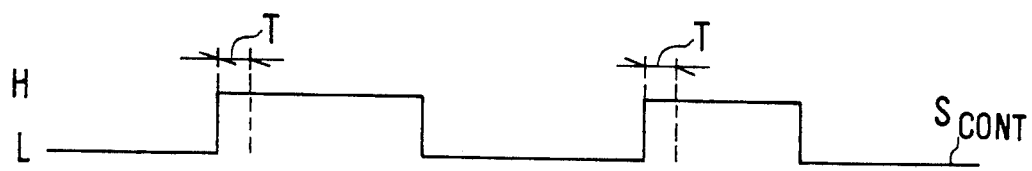
FIG. 28 is a signal waveform diagram illustrating the operation thereof.

In the coding operation by which the video signals $S_V$ are converted to digital signals, the video signal transmission system 163, as shown in FIG. 28, selects the intra coding operation to process picture data for a predetermined time interval T after the control signal $S_{CONT}$ raises.

After the lapse of the time interval T, picture data of only certain predetermined frames undergo the intra coding operation and are then transmitted.

In this manner, it is possible to intra code and send several frames of picture data immediately after the connection of the line L1.

It is thus possible to monitor a picture of the speaker at the end of the video signal transmission system 163 just after the connection of the line L1, and hence natural communication is realized.

Accordingly, it is possible to enhance the visibility of the video signal transmission system 163.

Moreover, in the video signal transmission system 163, output data of the line connecting unit 162 is decoded in a receiver 163B, which then outputs video signal $S_{VOUT}$ and voice output signals $S_{AOUT}$. In this manner, full two way conversation is achieved, including the monitoring of pictures of the speaker at the other end.

The video signal transmission system 163, as described in FIG. 15, takes a picture of a speaker through a television camera 66, and the video signals $S_V$ outputted from the television camera 66 are provided to a video signal processing circuit 67.

(8-2) Operation of the Fourth Embodiment

In the construction above, video signals $S_V$ outputted from the television camera 66 undergo the preliminary processing in the video signal processing circuit 67 to reduce the amount of data and are converted to picture data $D_{IN}$ in the CCITT format.

A motion vector of picture data $D_{IN}$ is determined for every macro block after the array of the picture data is rearranged in the motion vector detection circuit 68.

Here, picture data $D_{PRI}$ for comparison reference is produced based on the determined motion vector, and the picture data $D_{PRI}$ is outputted to the differential data construction circuit 70 together with the picture data $D_{IND}$.

In the differential data construction circuit 70, the intra coding operation is selected at a predetermined frame cycle, and for those frames, picture data $D_{IND}$ is directly outputted to the discrete cosine transform circuit 71.

On the other hand, in the inter coding operation picture data $D_{PRI}$ is subtracted from picture data $D_{IND}$ to produce differential data $D_Z$ and $D_{FZ}$, which are outputted to the discrete cosine transform circuit 71.

When in this case the line L1 is connected and the logic level of the control signals $S_{CONT}$ rises, picture data $D_{IND}$ of frames are outputted to the discrete cosine transform circuit 71 instead, through control of the switch circuit 91 by the digital signal processing circuit 134 (FIG. 16).

Thus, the intra frame operation is selected, and at the destination conversation can occur immediately without having to wait for number of frames after the line L1 is connected before the pictures become legible.

The transformed data $D_{DCT}$ which has been obtained through the discrete cosine transform circuit 71 is quantized in the quantizer 72, and then undergoes variable length coding processing in the variable length coding circuit 76 through the buffer circuit 77. The output data is sequentially sent to the destination through the transmission buffer circuit 73, the stuff bit adding circuit 78, the error correction circuit 79 and the multiplex conversion circuit 80.

The output data of the quantizer 72 is decoded to picture data in the decoder circuit 69 through the inverse quantization circuit 74 and the inverse discrete cosine transform circuit 75, and the picture data is outputted as picture data $D_{SV}$ of the previous frame for determining the motion vector.

(8-3) Effects of the Fourth Embodiment

From the foregoing construction, picture data of several frames are intra coded and then sent just after the line L1 is connected and thereby at the destination conversation may be had without having to wait for a number of frames after the line L1 is connected before the pictures become legible. Thus, usability is improved as compared to the prior art.

(8-4) Modification of the Fourth Embodiment

In the preceding embodiment, picture data of several frames are intra coded and then sent just after the line L1 is connected, and then the system switches to the normal operation. The present invention is not so limited. For example, the system may switch to intra frame coding just after the line L1 is cut off, and the system may wait for the reconnection of the line L1 in the intra coding mode.

While the foregoing has particularly shown and described the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of coding video signals comprising the steps of:
    alternatively intra coding or inter coding said video signals;
    transforming said intra coded and inter coded video signals to picture data by quantizing said coded video signals by a quantization step; and
    enlarging said quantization step to a predetermined rough quantization level when said video signals have been intra coded.

2. An apparatus for coding video signals comprising:
    coding means for high efficiency coding of said video signals;
    transforming means for transforming said coded video signals to picture data representing a video frame;
    transmission buffer means for temporarily storing said picture data;
    transmission means for sequentially outputting said picture data stored by said transmission buffer means to a transmission line at a speed corresponding to a data transmission capacity of said transmission line; and
    frame dropping means operative to drop said picture data representing a sequence of said video frames when an amount of residual data of said transmission buffer means exceeds a predetermined upper limit, and to continue said dropping of said picture data until said amount of residual data of said transmission buffer means reduces to a predetermined level smaller than said upper limit.

3. A filter circuit comprising:
    vertical digital filter means including a plurality of vertical delay circuits connected in series, each said vertical delay circuit outputting vertical output picture data which are consecutive in the vertical scanning direction;

vertical selection means corresponding to said vertical digital filter means for selectively outputting said vertical output picture data;

horizontal digital filter means including a plurality of horizontal delay circuits connected in series, each said horizontal delay circuit outputting horizontal output picture data which are consecutive in the horizontal scanning direction;

horizontal selection means corresponding to said horizontal digital filter means for selectively outputting said horizontal output picture data;

means for sequentially inputting input picture data to one of said vertical and horizontal digital filter means;

means for supplying the output of the one of said vertical and horizontal selection means corresponding to said one of said vertical and horizontal digital filter means to the other one of said vertical and horizontal digital filter means; and means for controlling said vertical and horizontal selection means so that output picture data outputted from the one of said vertical and horizontal selection means corresponding to said other one of said vertical and horizontal digital filter means is corrected by switching said selective outputs from said vertical and horizontal selection means.

4. A method of coding video signals comprising the steps of:

alternatively intra coding or inter coding said video signals representing a video frame;

transforming said intra coded and inter coded video signals to picture data by quantizing said coded video signals by a quantization step;

calculating a power of said inter coded video signals representing said video frame; and reducing said quantization step to a predetermined ratio of said quantization step by which said video signals representing the video frame immediately previous to said video frame have been quantized in said transforming step, when said calculated power is smaller than a predetermined threshold value.

5. A method of coding video signals comprising the steps of:

alternatively intra coding or inter coding said video signals;

transforming said intra coded and inter coded video signals to picture data by quantizing said coded video signals by a quantization step;

calculating a power of said inter coded video signals; and enlarging said quantization step to a predetermined rough quantization level, when said calculated power is larger than a predetermined threshold value.

6. A method of operating a video signal transmission apparatus capable of selectively inter coding and intra coding video signals, comprising the steps of:

connecting said apparatus to a destination through a transmission line;

for a predetermined time interval after said apparatus is connected to said destination, selecting a mode of operation in which each frame of said video signals is intra coded so that a plurality of intra coded frames of said signals are transmitted during said interval; and upon termination of said interval, selecting a normal mode of operation in which said video signals are selectively inter coded and intra coded according to a repetitive, predetermined cycle.

* * * * *